US008508455B2

(12) United States Patent
Iisaka et al.

(10) Patent No.: US 8,508,455 B2
(45) Date of Patent: Aug. 13, 2013

(54) VIDEO PROCESSING CIRCUIT, VIDEO PROCESSING METHOD, LIQUID CRYSTAL DISPLAY APPARATUS, AND ELECTRONIC APPARATUS

(75) Inventors: Hidehito Iisaka, Shiojiri (JP); Hiroyuki Hosaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 12/871,389

(22) Filed: Aug. 30, 2010

(65) Prior Publication Data

US 2011/0051006 A1 Mar. 3, 2011

(30) Foreign Application Priority Data

Sep. 1, 2009 (JP) ................................ 2009-201340

(51) Int. Cl.
*G09G 3/36* (2006.01)
*G06F 3/041* (2006.01)

(52) U.S. Cl.
USPC ............................................ 345/98; 345/178

(58) Field of Classification Search
USPC .................................................... 345/98, 205
See application file for complete search history.

(56) References Cited

U.S. PATENT DOCUMENTS 5,990,995 A * 11/1999 Ebihara et al. ................ 349/113
2008/0018630 A1 * 1/2008 Fujino ........................... 345/205

FOREIGN PATENT DOCUMENTS

EP 1 225 558 * 7/2002
EP 1 225 558 A1 7/2002
JP A-6-34965 2/1994
JP A-2009-69608 4/2009

OTHER PUBLICATIONS

Armitage, D. et al, "Reflective Liquid Crystal Microdisplays," *Introduction to Microdisplays*, 2006, pp. 173-210, John Wiley & Sons, Ltd., U.K.

European Patent Office, European Search Report for European Patent Application No. 10174752.5, Dec. 2, 2010, pp. 1-9.

* cited by examiner

*Primary Examiner* — Michael Faragalla
(74) *Attorney, Agent, or Firm* — Oliff & Berridge, PLC

(57) ABSTRACT

Provided is a video processing circuit which designates an applied voltage, which is to be applied to a liquid crystal element of each pixel, based on a video signal, including: a first boundary detection portion which analyzes a video signal of a current frame and detects a boundary between a pixel, to which an applied voltage near a maximum grayscale is applied, and a pixel, to which an applied voltage near a minimum grayscale is applied, based on the video signal; a second boundary detection portion which analyzes a video signal of a frame preceding the current frame and detects a boundary between the pixel, to which the applied voltage near the maximum grayscale is applied, and the pixel, to which the applied voltage near the minimum grayscale is applied, based on the video signal; and a correction portion which corrects the applied voltage to a voltage which provides an initial tilt angle to a liquid crystal molecule in a case where the applied voltage designated with the video signal of a pixel adjacent to a portion changed from the boundary detected by the second boundary detection portion among the boundaries detected by the first boundary detection portion is lower than the voltage which provides the initial tilt angle to the liquid crystal molecule.

14 Claims, 19 Drawing Sheets

SCAN LINE DRIVING CIRCUIT

VIDEO PROCESSING CIRCUIT

CORRECTION PROCESS: NO

CORRECTION PROCESS: PERFORMED (1) VIDEO SIGNAL (BEFORE CORRECTION)

(2) BOUNDARY DETECTION (3) CORRRECTION PROCESS (FOR 2 PIXELS)

CORRECTION PROCESS: NO

CORRECTION PROCESS: PERFORMED

CORRECTION PROCESS: NO

CORRECTION PROCESS: PERFORMED (1) VIDEO SIGNAL (CURRENT FRAME)

(2) VIDEO SIGNAL (CURRENT FRAME)

(3) BOUNDARY COMPARISON

VIDEO PROCESSING CIRCUIT, VIDEO PROCESSING METHOD, LIQUID CRYSTAL DISPLAY APPARATUS, AND ELECTRONIC APPARATUS

This application claims priority to JP 2009-201340 filed in Japan on Sep. 1, 2009, the entire disclosure of which is hereby incorporated by reference it its entirety.

BACKGROUND

1. Technical Field

The present invention relates to a technology of reducing defects in the display of a liquid crystal panel.

2. Related Art

A liquid crystal panel has a configuration where liquid crystal is interposed by a pair of substrates which are separated by a constant gap.

More specifically, the liquid crystal panel is configured by arraying pixel electrodes of pixels in a matrix shape on the one substrate and by disposing a common electrode on the other substrate so as to be common to the pixels, so that the liquid crystal is interposed by the pixel electrodes and the common electrode. If a voltage according to a grayscale level is applied and sustained between the pixel electrode and the common electrode, an alignment state of the liquid crystal is defined for each pixel, so that transmittance or reflectance is controlled. Therefore, in the above configuration, it may be stated that, in the electric field exerted on the liquid crystal molecule, only the component in the direction from the pixel electrode toward the common electrode (or the opposite direction), that is, the component in the vertical direction (longitudinal direction) with respect to the surface of the substrate is contributed to the display control.

However, recently, the pixel pitch is narrowed for the miniaturization and the high accuracy. Accordingly, there is an electric field generated from the adjacent pixel electrodes, that is the electric field in the direction (transverse direction) parallel to the surface of the substrate, so that the influence thereof may not be ignored. For example, if the transverse electric field is added to the liquid crystal which is to be driven by the electric field in the longitudinal direction, for example, in a VA (Vertical Alignment) scheme, a TN (Twisted Nematic) scheme, or the like, there are alignment defects (reverse tilt domain) in the liquid crystal occurs, so that there is a problem in that defects in the display occurs.

In order to reduce the influence of the reverse tilt domain, there is disclosed a technology (for example, refer to JP-A-6-34965 (FIG. 1)) of contriving a structure of the liquid crystal panel such as defining a shape of a light-shielding layer (aperture portion) in coincidence with each pixel electrode, or there is disclosed a technology (for example, refer to JP-A-2009-69608 (FIG. 2)) where, if an average luminance value calculated from video signals is equal to or lower than a threshold value, it is determined that the reverse tilt domain has occurred and video signals, of which the value is equal to or higher than a specific value, are clipped.

However, in the technology of reducing the reverse tilt domain by using the structure of the liquid crystal panel, there are problems in that the aperture ratio may be easily lowered and in that a liquid crystal panel that is already manufactured may not be employed without contrivance of the structure thereof. On the other hand, in the technology where the video signals of which the values are equal to or higher than the specific value are clipped, there is a problem in that the brightness of the displayed image is limited to the specific value.

SUMMARY

An advantage of some aspects of the invention is to provide a technology of reducing a reverse tilt domain while solving the aforementioned problems.

According to a first aspect of the invention, there is provided a video processing circuit which designates an applied voltage, which is to be applied to a liquid crystal element of each pixel, based on a video signal, including: a first boundary detection portion which analyzes a video signal of a current frame and detects a boundary between a pixel, to which an applied voltage near a maximum grayscale is applied, and a pixel, to which an applied voltage near a minimum grayscale is applied, based on the video signal; a second boundary detection portion which analyzes a video signal of a frame preceding the current frame and detects a boundary between the pixel, to which the applied voltage near the maximum grayscale is applied, and the pixel, to which the applied voltage near the minimum grayscale is applied, based on the video signal; and a correction portion which corrects the applied voltage to a voltage which provides an initial tilt angle to a liquid crystal molecule in a case where the applied voltage designated with the video signal of a pixel adjacent to a portion changed from the boundary detected by the second boundary detection portion among the boundaries detected by the first boundary detection portion is lower than the voltage which provides the initial tilt angle to the liquid crystal molecule. According to the invention, since the structure of the liquid crystal panel 100 may not have to be changed, a decrease in an aperture ratio does not occur. In addition, the invention may be adapted to a liquid crystal panel, which is already manufactured, without contrivance of the structure. In addition, among the pixels adjacent to the boundary, since the applied voltage is corrected to the voltage which provides the initial tilt angle to the liquid crystal molecule, the brightness of the to-be-displayed image is not limited to a specific value.

According to a second aspect of the invention, there is provided a video processing circuit which designates an applied voltage, which is to be applied to a liquid crystal element of each pixel, based on a video signal, including: a first boundary detection portion which analyzes a video signal of a current frame and detects a boundary between a first pixel where an applied voltage designated with the video signal is lower than a first voltage and a second pixel where the applied voltage is equal to or higher than a second voltage which is higher than the first voltage; a second boundary detection portion which analyzes a video signal of a frame preceding the current frame and detects a boundary between the first pixel and the second pixel; and a correction portion which corrects the applied voltage, which is applied to the liquid crystal element corresponding to the first pixel adjacent to a portion changed from the boundary detected by the second boundary detection portion among the boundaries detected by the first boundary detection portion, from the applied voltage designated with the video signal of the current frame to a third voltage which is equal to or higher than the first voltage and is lower than the second voltage.

According to the invention, since the structure of the liquid crystal panel 100 may not have to be changed, a decrease in an aperture ratio does not occur. In addition, the invention may be adapted to a liquid crystal panel, which is already manufactured, without contrivance of the structure. In addition, among the pixels adjacent to the boundary since the applied voltage of the liquid crystal element corresponding to the first pixel is corrected to the third voltage from the value corresponding to the grayscale level designated with the video signal, so that the brightness of the to-be-displayed image is not limited to a specific value.

In this case, it is preferable that the correction portion corrects the applied voltage, which is applied to the liquid crystal element corresponding to the second pixel adjacent to the portion changed from the boundary detected by the second boundary detection portion among the boundaries detected by the first boundary detection portion, to a fourth voltage which is higher than the third voltage and is lower than the second voltage. According to such a configuration, it is possible to prevent an outline of an image viewed by a user from being shifted from the information on the image defined by the video signal.

In addition, in this case, it is preferable that the correction portion sets the applied voltage, which is applied to the liquid crystal element corresponding to a pixel not adjacent to the portion changed from the boundary detected by the second boundary detection portion among the boundaries detected by the first boundary detection portion, to the applied voltage designated with the video signal of the current frame.

According to a third aspect of the invention, there is provided a video processing circuit which inputs a video signal designating an applied voltage of a liquid crystal element of each pixel and defines the applied voltage of the liquid crystal element based on a processed video signal, including: a boundary detection portion which analyzes a video signal of a current frame and detects a boundary between a first pixel, where the applied voltage designated with the video signal is lower than a first voltage, and a second pixel, where the applied voltage is equal to or higher than a second voltage which is higher than the first voltage; and a correction portion which corrects the applied voltage of the liquid crystal element corresponding to the second pixel adjacent to the detected boundary to be lower than the applied voltage designated with the video signal of the current frame. According to the configuration, a transverse electric field generated by the first pixel and the second pixel is decreased.

In addition, in addition to the video processing circuit, the invention may be configured as a video processing method, a liquid crystal display, and an electronic apparatus including the liquid crystal display apparatus.

BRIEF DESCRIPTION OF THE DRAWINGS

The invention will be described with reference to the accompanying drawings, wherein like numbers reference like elements.

DETAILED DESCRIPTION OF EMBODIMENTS

First Embodiment

Hereinafter, embodiments of the invention will be described with reference to the drawings.

Figure 1:
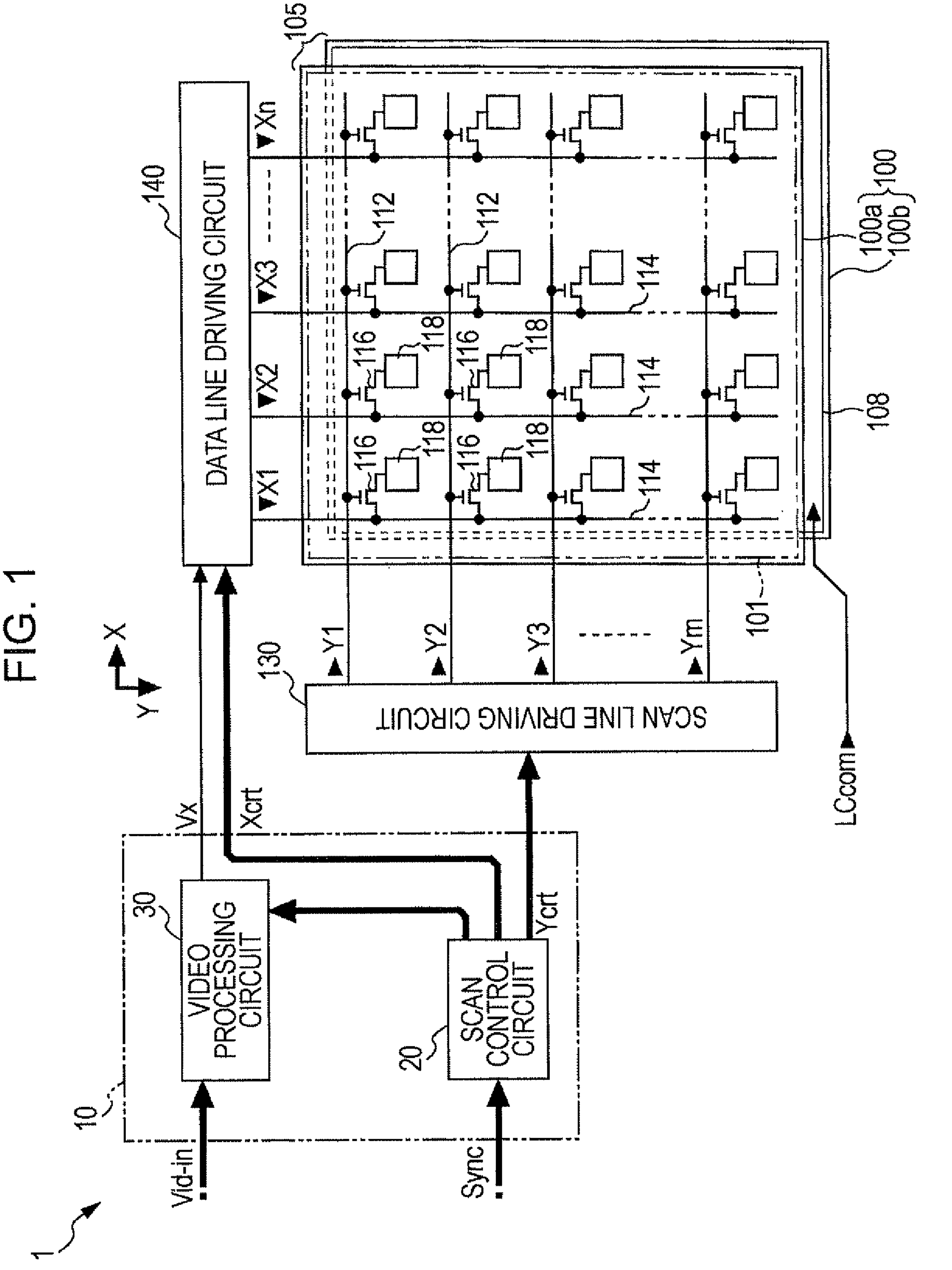
FIG. 1 is a diagram illustrating a liquid crystal display apparatus employing a video processing circuit according to a first embodiment of the invention.

FIG. 1 is a block diagram illustrating the entire configuration of a liquid crystal display apparatus employing a video processing circuit according to the embodiment.

As illustrated in this figure, the liquid crystal display apparatus 1 includes a control circuit 10, a liquid crystal panel 100, a scan line driving circuit 130, and a data line driving circuit 140.

A video signal Vid-in is supplied from a higher level apparatus to the control circuit 10 in synchronization with a synchronization signal Sync. The video signal Vid-in is a digital data designating a grayscale level of each pixel of the liquid crystal panel 100 and is supplied in a scanning sequence according to a vertical scan signal, a horizontal scan signal, and a dot clock signal (these are not shown) included in the synchronization signal Sync.

In addition, although the video signal Vid-in designates the grayscale level, since an applied voltage of a liquid crystal element is determined according to the grayscale level, it may be denoted that the video signal Vid-in designates the applied voltage of the liquid crystal element.

The control circuit 10 includes a scan control circuit 20 and a video processing circuit 30. The scan control circuit 20 generates various control signals to control each components in synchronization with the synchronization signal Sync. As described later in detail, the video processing circuit 30 performs a process on the digital video signal Vid-in to output an analog data signal Vx.

The liquid crystal panel 100 has a configuration where a element substrate (first substrate) 100*a* and an opposite substrate (second substrate) 100_b_ are attached to each other with a certain gap maintained and liquid crystal 105, which is driven by a vertical direction electric field, is interposed within the gap.

On a facing surface of the element substrate 100_a_, which faces the opposite substrate 100_b_, a plurality of m rows of scan lines 112 are disposed in the X (horizontal) direction, and a plurality of n columns of data lines 114 are disposed in the Y (vertical) direction with electrical insulation from the scan lines 112 maintained.

In addition, in the embodiment, in order to identify the scan lines 112, the scan lines 112 may be sometimes referred to as 1st, 2nd, 3rd, . . . , (m−1)-th, and m-th rows sequentially from the upper side of the figure. Similarly, in order to identify the data lines 114, the data lines 114 may be sometimes referred to as 1st, 2nd, 3rd, . . . , (n−1)-th, and n-th columns sequentially from the left side of the figure.

In addition, on the element substrate 100_a_, a set of an n-channel type TFT 116 and a rectangular transparent pixel electrode 118 is disposed so as to correspond to each of intersections of the scan lines 112 and the data lines 114. A gate electrode of the TFT 116 is connected to the scan line 112, a source electrode thereof is connected to the data line 114, and a drain electrode thereof is connected to the pixel electrode 118.

On the other hand, on a facing surface of the opposite substrate 100_b_, which faces the element substrate 100_a_, a transparent common electrode 108 is disposed over the entire surface. A voltage LCcom is applied to the common electrode 108 by a circuit (not shown).

In addition, in FIG. 1, since the facing surface of the element substrate 100_a_ is the rear side of the paper surface, the scan lines 112, the data lines 114, the TFTs 116, and the pixel electrodes 118 disposed on the facing surface may have to be indicated by dotted lines. However, since these may not be easily seen, these are indicated by solid lines.

Figure 2:
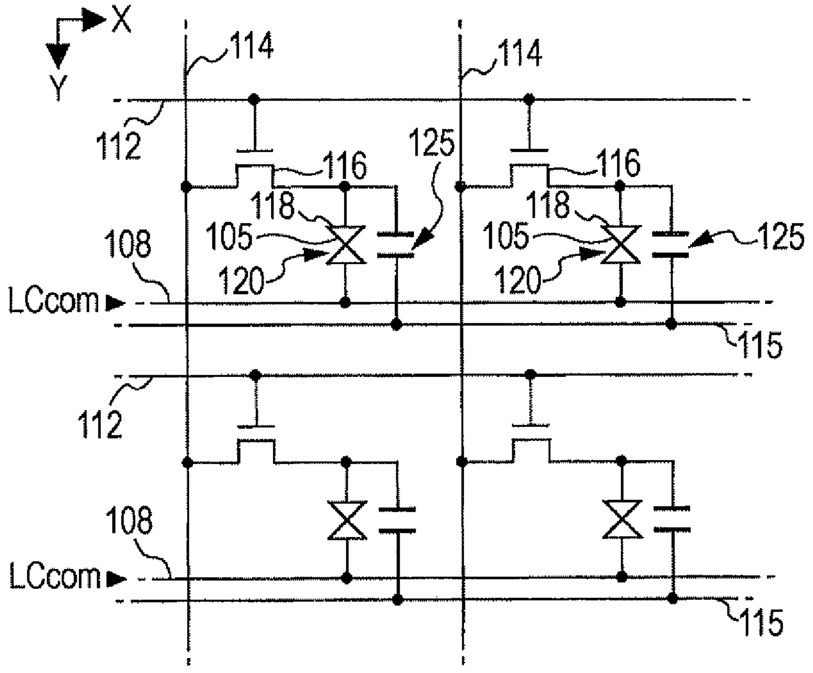
FIG. 2 is a diagram illustrating an equivalent circuit of a liquid crystal element in the liquid crystal display.

As illustrated in FIG. 2, an equivalent circuit of the liquid crystal panel 100 has a configuration where liquid crystal elements 120 formed by interposing the liquid crystal 105 between the pixel electrodes 118 and the common electrode 108 are arrayed so as to correspond to the intersections of the scan lines 112 and the data lines 114.

In addition, although omitted from FIG. 1, in the equivalent circuit of the liquid crystal panel 100, actually as illustrated in FIG. 2, auxiliary capacitances (storage capacitances) 125 are disposed in parallel to the liquid crystal elements 120. The one terminal of the auxiliary capacitance 125 is connected to the pixel electrode 118, and the other terminal thereof is connected to a capacitance line 115. The capacitance line 115 is maintained in a voltage which is constant over time.

If the scan line 112 becomes a H level, the TFT 116 of which the gate electrode is connected to the scan line is allowed to turn ON, so that the pixel electrode 118 is connected to the data line 114. Therefore, when the scan line 112 is at the H level, if a data signal of a voltage according to a grayscale is supplied to the data line 114, the data signal is applied through the turned-ON TFT 116 to the pixel electrode 118. If the scan line 112 becomes an L level, the TFT 116 is allowed to turn OFF. However, the voltage applied to the pixel electrode is sustained by the capacitance of the liquid crystal element 120 and the auxiliary capacitance 125.

In the liquid crystal element 120, a molecule alignment state of the liquid crystal 105 is changed according to the electric field generated by the pixel electrode 118 and the common electrode 108. Therefore, if the liquid crystal element 120 is a transmission type, a transmittance according to an applied voltage and a sustaining voltage is implemented.

In the liquid crystal panel 100, the transmittance is changed according to the liquid crystal elements 120, the liquid crystal elements 120 correspond to pixels. Accordingly, an array area of the pixels becomes a display area 101. In addition, in the embodiment, the liquid crystal 105 is configured as a VA type, and a normally black mode, where the liquid crystal element 120 becomes a black state when no voltage is applied, is employed.

Figures 5A, 5B:
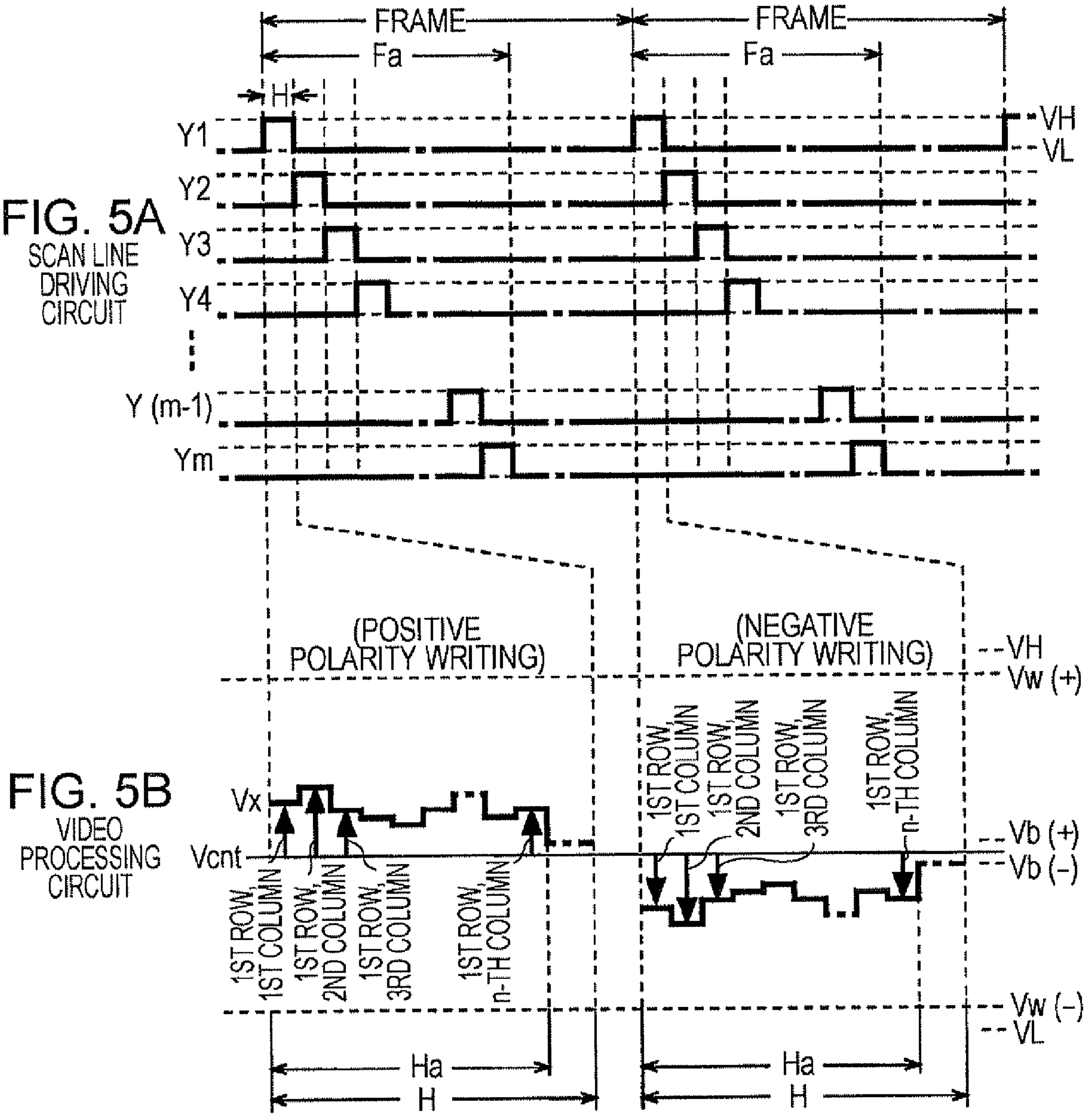
FIG. 5 are diagrams illustrating display operations of the liquid crystal display apparatus.

The scan line driving circuit 130 supplies scan signals Y1, Y2, Y3, . . . , and Ym to the scan lines 112 of the 1st, 2nd, 3rd, . . . , and m-th rows according to a control signal Yctr of the scan control circuit 20. More specifically, as illustrated in FIG. 5A, the scan line driving circuit 130 selects the scan lines 112 over a frame in a sequence of the 1st, 2nd, 3rd, . . . , (m−1)-th, and m-th rows and allows the scan signal of the selected scan line to be set to a selection voltage VH (H level) and the scan signals of the other scan lines to be set to a non-selection voltage VL (L level).

In addition, the frame denotes a time interval taken to display one coma of the image by driving the liquid crystal panel 100. If the frequency of the vertical scan signal included in the synchronization signal Sync is 60 Hz, the frame is 16.7 milliseconds, which is the reciprocal number of the frequency.

The data line driving circuit 140 samples the data signals Vx, which are supplied from the video processing circuit 30, as data signals X1 to Xn at the 1st to n-th data lines 114 according to the control signal Xctr of the scan control circuit 20.

In addition, in the description, with respect to the voltage, a ground voltage (not shown) is set as a reference of zero voltage if not particularly described, except for the applied voltage of the liquid crystal element 120. The applied voltage of the liquid crystal element 120 is a potential difference between the voltage LCcom of the common electrode 108 and the voltage of the pixel electrode 118 and is distinguished from other voltages.

Figure 4A:
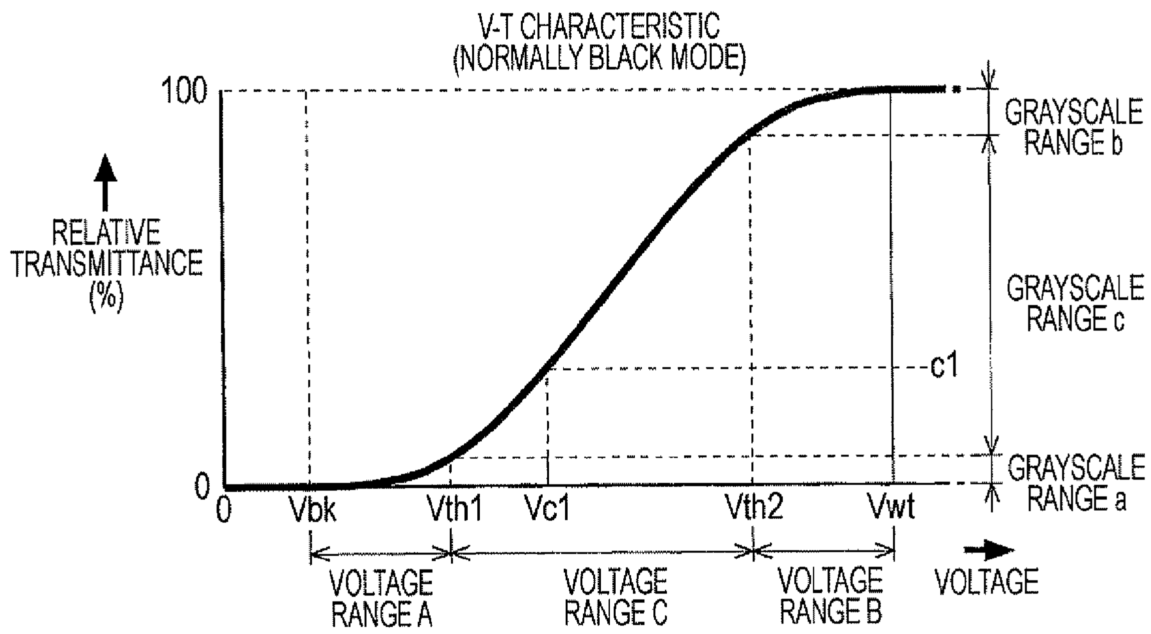
FIG. 4 are diagrams illustrating display characteristics of the liquid crystal display apparatus.

In the embodiment, in the case of the normally black mode, a relationship between the applied voltage and the transmittance of the liquid crystal element 120 is represented by a V-T characteristic illustrated by FIG. 4A. Therefore, if the liquid crystal element 120 is configured with a transmittance according to a grayscale level designated with the video signal Vid-in, a voltage according to the grayscale level may be applied to the liquid crystal element 120.

However, in some cases, if the applied voltage of the liquid crystal element 120 is defined according to only the grayscale level designated with the video signal Vid-in, the defects in the display caused by the reverse tilt domain may occur.

One reason of the defect is considered as follows. When the liquid crystal molecules interposed in the liquid crystal element 120 are in the unstable state, the liquid crystal molecules are disturbed by the influence of the transverse electric field. After that, the alignment state according to the applied voltage may not be easily obtained.

If the applied voltage of the liquid crystal element 120 is in a voltage range A which is equal to or higher than the voltage Vbk of the black level and is lower than a threshold value Vth1 (first voltage) in the normally black mode, the regulation force by the longitudinal electric field is slightly higher than the regulation force by the alignment layer, the alignment state of the liquid crystal molecules may be easily disturbed. This is the time when the liquid crystal molecule is in the unstable state.

For the convenience, a range of transmittance (grayscale range) of a liquid crystal element of which the applied voltage is in the voltage range A is referred to as "a".

On the other hand, the case where the pixel is influenced by the transverse electric field is a case where the potential difference between the adjacent pixel electrodes is increased. This is a case where the dark pixel of the black level or near the black level and the white pixel of the white level or near the white level are adjacent to each other in the to-be-displayed image.

In such a normally black mode illustrated in FIG. 4A, the dark pixel is a liquid crystal element 120 of which the applied voltage is in the voltage range A, and the bright pixel is a liquid crystal element which exerts the transverse electric field to the dark pixel. In order to specify the bright pixel, the bright pixel is designated as a liquid crystal element 120 of which the applied voltage is equal to or higher than a threshold value Vth2 (second voltage) and is in the voltage range B which is equal to or lower than a white level voltage Vwt in the normally black mode.

For the convenience, a range of transmittance (grayscale range) of a liquid crystal element of which the applied voltage is in the voltage range B is referred to as "b".

In addition, in the normally black mode, the threshold value Vth1 may be considered to be an optical threshold voltage which sets a relative transmittance of a liquid crystal element to 10%, and the threshold value Vth2 may be considered to be an optical threshold voltage which sets a relative transmittance of a liquid crystal element to 90%.

When the liquid crystal element of which the applied voltage is in the voltage range A is adjacent to a liquid crystal element in the voltage range B, the liquid crystal element in the voltage range A is affected by a transverse electric field, so that the reverse tilt domain may easily occur.

In addition, on the contrary, when the liquid crystal element in the voltage range B is adjacent to the liquid crystal element in the voltage range A, the liquid crystal element in the voltage range B is dominantly affected by a longitudinal electric field and, thus, in the stable state, so that the reverse tilt domain may not occur unlike the liquid crystal element in the voltage range A.

Figure 19A:
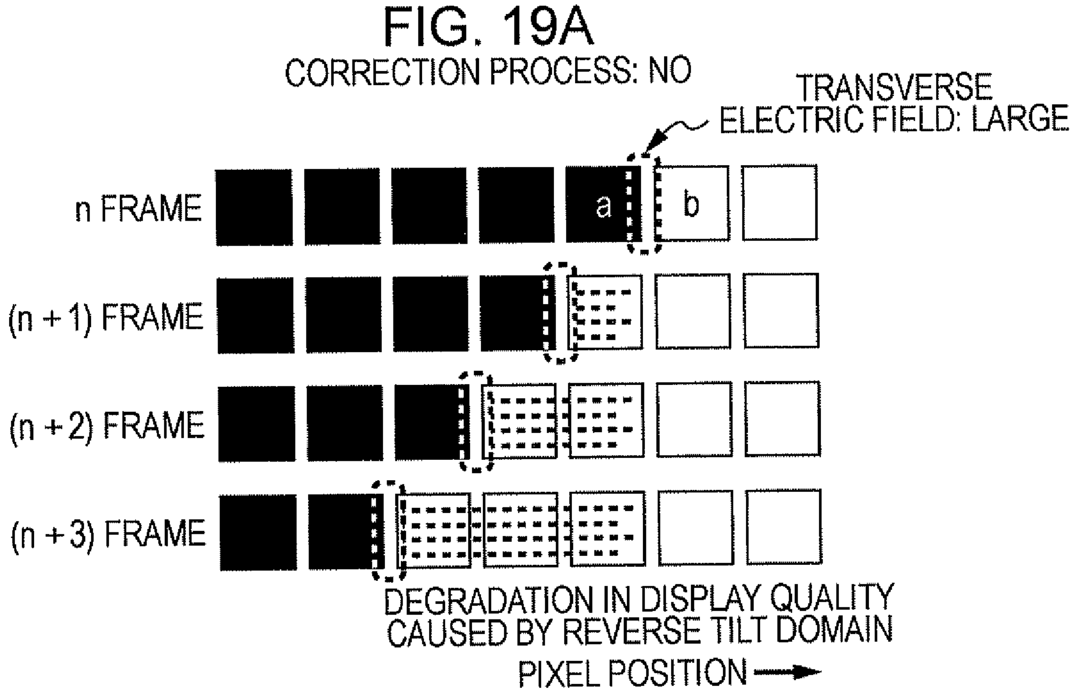
FIGS. 19A and 19B are diagrams illustrating an example of defects in the display caused by influence of a transverse electric field.
Figure 19B:
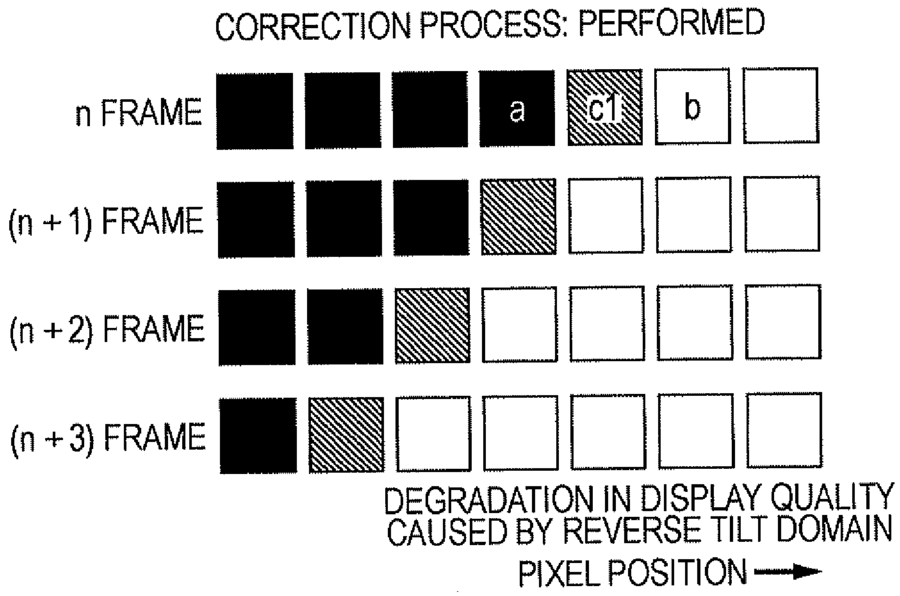

Now, an example of the defects in the display is described. In the case where the image represented by the video signal Vid-in is that illustrated in, for example, FIG. 19A, more specifically, in the case where the dark pixel in the grayscale range a is moved by one pixel in each frame in the left direction with respect to the bright pixel in the grayscale range b as a background, a so-called tailing phenomenon occurs, in which a pixel to be changed from the dark pixel to the bright pixel is not at a grayscale in the grayscale range b due to the occurrence of the reverse tilt domain.

One reason of the phenomenon is considered as follows. When the dark pixel and the bright pixel are adjacent, since the transverse electric field between these pixels are increased, the alignment of the liquid crystal molecules in the dark pixel is disturbed, and the area where the alignment is disturbed is spread according to the movement of the dark pixel.

Therefore, in order to suppress the occurrence of the defects in the display caused by the disturbance of the alignment of the liquid crystal molecules, even in the case where the dark pixel and the bright pixel are adjacent in the image represented by the video signal Vid-in, it is important to allow the dark pixel and the bright pixel not to be adjacent in the liquid crystal panel 100.

In the embodiment, as illustrated in FIG. 1, the video processing circuit 30 is disposed at the front stage of the liquid crystal panel 100, and the video processing circuit 30 analyzes the image represented by the video signal Vid-in and determines whether or not there is a state where the dark pixel in the grayscale range a and the bright pixel in the grayscale range b are adjacent to each other. If there is the state, the grayscale level of the pixel of which the applied voltage is to be lowered, that is, the pixel which is easily influenced by the transverse electric field (the dark pixel in the normally back mode) among the pixels which are adjacent to the boundary between the dark pixel and the bright pixel is replaced with the grayscale level c1 which is included in different grayscale range c which is neither the grayscale range a nor the grayscale range b. Therefore, in the liquid crystal panel 100, since the voltage Vc1 corresponding to the grayscale level c1 is applied to the liquid crystal element 120 corresponding to the dark pixel, a strong transverse electric field is not generated.

Next, the video processing circuit 30 is described in detail with reference to FIG. 3. As illustrated in this figure, the video processing circuit 30 includes a correction portion 300, a boundary detection portion 302, a delay circuit 312, and a D/A converter 316.

The delay circuit 312 is configured with an FIFO (Fast In Fast Out) memory or a multi-stage latch circuit which stores the video signal Vid-in supplied from an upper-level apparatus and, after an elapse of a predetermined time, reads the video signal Vid-in to output as a video signal Vid-d. In addition, the storing and reading of the delay circuit 312 are controlled by the scan control circuit 20.

In the embodiment, the boundary detection portion 302 firstly analyzes the image represented by the video signal Vid-in to determine whether or not there exists a portion adjacent to the pixel in the grayscale range a and the pixel in the grayscale range b. Secondly, if it is determined that there exists a portion adjacent thereto, the boundary detection portion 302 detects the boundary which is the adjacent portion.

In addition, the boundary referred herein denotes a portion where the pixel in the grayscale range a and the pixel in the grayscale range b are adjacent to each other. Therefore, for example, a portion where the pixel in the grayscale range a and the pixel in the grayscale range c are adjacent to each other or a portion where the pixel in the grayscale range b and the pixel in the grayscale range c are adjacent to each other is not treated as the boundary.

The correction portion 300 includes a determination portion 310 and a selector 314. The determination portion 310 determines whether or not the grayscale level of the pixel represented by the video signal Vid-d delayed by the delay circuit 312 is included in the grayscale range a (first determination) and determines whether or not the pixel is adjacent to the boundary detected by the boundary detection portion 306 (second determination). If both determination results are "Yes", a flag Q of an output signal is set to, for example, "1". If any one of the determination results is "No", the flag Q is set to "0".

In addition, if the video signals of at least the plurality of lines are not accumulated, the boundary detection portion 302 may not detect a boundary in a to-be-displayed image. Therefore, in order to adjust a timing of supplying the video signals Vid-in, the delay circuit 312 is provided.

For this reason, since the timing of the video signal Vid-in supplied from an upper level apparatus is different from the timing of the video signal Vid-d supplied from the delay circuit 312, strictly speaking, the timings are not coincident with each other in the horizontal scan periods thereof or the like. However, hereinafter, the description is made without particular discrimination of the two timings.

The selector 314 selects any one of the input terminals a and b according to the flag Q supplied to the control terminal Sel and outputs the signal, which is supplied to the selected input terminal, as a video signal Vid-out from the output terminal Out. More specifically, in the selector 314, the input terminal a is supplied with the video signal Vid-d by the delay circuit 312, and the input terminal b is supplied with a video signal of the grayscale level c1 as a signal for replacement. Therefore, if the flag Q supplied to the control terminal Sel is "1", the selector 314 selects the input terminal b, and if the flag Q is "0", the selector 314 outputs the video signal Vid-d, which is supplied to the input terminal a, as a video signal Vid-out.

The D/A converter 316 converts the video signal Vid-out, which is a digital data, to an analog data signal Vx.

In order to preventing an DC component from being applied to the liquid crystal 105, the voltage of the data signal Vx is alternately switched between the positive polarity voltage at the higher side and the negative polarity voltage at the lower side with respect to the voltage Vc, which is the center of the video amplitude, for example, each frame.

In addition, although a voltage LCcom applied to the common electrode 108 may be considered to be almost equal to the voltage Vc, in consideration of off leak or the like of an n-channel type TFT 116, the voltage LCcom may be adjusted to be lower than the voltage Vc.

In such a configuration, if the flag Q is "1", it denotes that the grayscale level of the pixel represented by the video signal Vid-in is included in the grayscale range a and the pixel is adjacent to the boundary with respect to the bright pixel, that is, that the reverse tilt domain easily occurs due to the influence of the transverse electric field from the bright pixel adjacent thereto with the boundary interposed therebetween.

If the flag Q is "1", the selector 314 selects the input terminal b. Therefore, the video signal Vid-d designating the grayscale level of the grayscale range a is replaced with the video signal designating the grayscale level c1 to be output as a video signal Vid-out.

On the other hand, if the flag Q is "0", the selector 314 selects the input terminal a. Therefore, the delayed video signal Vid-d is output as a video signal Vid-out.

Now, the display operation of the liquid crystal display apparatus 1 is described. The video signals Vid-in are supplied from an upper apparatus over a frame in the order of the 1st row 1st column to 1st row n-th column pixels, the 2nd row 1st column to 2nd row n-th column pixels, the 3rd column 1st column to 3rd column n-th column pixels, . . . , and the m-th column 1st column to m-th column n-th column pixels. The video processing circuit 30 performs a delaying process, a replacing process, and the like on the video signal Vid-in to output a video signal Vid-out.

Herein, in the horizontal effective scan period (Ha) where the video signals Vid-out of the 1st row 1st column to 1st row n-th column pixels are output, each of the processed video signals Vid-out are converted to a data signal Vx having a positive polarity or a negative polarity illustrated in FIG. 5B, in this case, for example, a positive polarity by the D/A converter 316. The data signal Vx is sampled in the 1st to n-th data lines 114 as data signals X1 to Xn by the data line driving circuit 140.

On the other hand, in the horizontal scan period where the video signals Vid-out of the 1st row 1st column to 1st row n-th column are output, the scan control circuit 20 controls the scan line driving circuit 130 so that only the scan signal Y1 is at the H level. If the scan signal Y1 is at the H level, the TFTs 116 of the 1st row are in the on state, the data signals sampled in the data line 114 are applied to the pixel electrodes 118 through the on-state TFTs 116. Therefore, the positive polarity voltages according to the grayscale levels designated with the video signals Vid-out are written in the liquid crystal elements of the 1st row 1st column to the 1st row n-th column.

Subsequently, similarly, the video signals Vid-in of the 2nd row 1st column to the 2nd row n-th column are processed by the video processing circuit 30 to be output as video signals Vid-out and converted to the positive-polarity data signals by the D/A converter 316, and after that, are sampled in the 1st to n-th data lines 114 by the data line driving circuit 140.

In the horizontal scan period where the video signals Vid-out of the 2nd row 1st column to the 2nd row n-th column are output, since only the scan signal Y2 is at the H level by the scan line driving circuit 130, the data signals sampled in the data line 114 are applied to the pixel electrodes 118 through the TFTs 116 of the 2nd row, which are in the on state. Therefore, the positive-polarity voltages according to the grayscale levels designated with the video signals Vid-out are written in the liquid crystal elements of the 2nd row 1st column to the 2nd row n-th column.

The same writing operations are performed on the 3rd, 4-th, . . . , and m-th rows, so that the voltages according to the grayscale levels designated by the video signals Vid-out are written in the liquid crystal elements. Therefore, the transmission image designated by the video signals Vid-in is formed.

In the next frame, except that the video signals Vid-out are inverted into the negative-polarity data signals by the polarity inversion of the data signals, the same writing operation is performed.

FIG. 5B is a voltage waveform diagram illustrating an example of a data signal Vx when the video signals Vid-out of the 1st row 1st column to the 1st row n-th column are output from the video processing circuit 30 in the horizontal scan period (H). In the embodiment, since the normally black mode is employed, if the data signal Vx is at the positive polarity, the data signal becomes a higher level voltage (indicated by ↑ in the figure) of which the level is increased by a level corresponding to the grayscale level processed by the video processing circuit 30 with respect to the reference voltage Vent. If the data signal is at the negative polarity, the data signal becomes a lower level voltage (indicated by ↓ in the figure) of which the level is decreased by the level corresponding to the grayscale level with respect to the reference voltage Vent.

More specifically, in the case of the positive polarity, the voltage of the data signal Vx becomes a voltage deflected by the voltage corresponding to the grayscale with respect to the reference voltage Vent in a range from the voltage Vw(+) corresponding to the white color to the voltage Vb(+) corresponding to the black color. In the case of the negative polarity, the voltage of the data signal becomes a voltage deflected by the voltage corresponding to the grayscale with respect to the reference voltage Vcnt in a range from the voltage Vw(−) corresponding to the white color to the voltage Vb(−) corresponding to the black color.

The voltage Vw(+) and the voltage Vw(−) have a symmetric relationship with respect to the voltage Vcnt. The voltage Vb(+) and the voltage Vb(−) also have a symmetric relationship with respect to the voltage Vcnt.

In addition, FIG. 5B illustrates a voltage waveform of the data signal Vx, which is different from the voltage applied to the liquid crystal element 120 (the potential difference between the pixel electrode 118 and the common electrode 108). In addition, in FIG. 5B, the vertical scale of the voltage of the data signal is enlarged in comparison with the voltage waveform of the scan signal or the like in FIG. 5A.

A detailed example of the process of the video processing circuit 30 according to the first embodiment is described.

Figure 6:
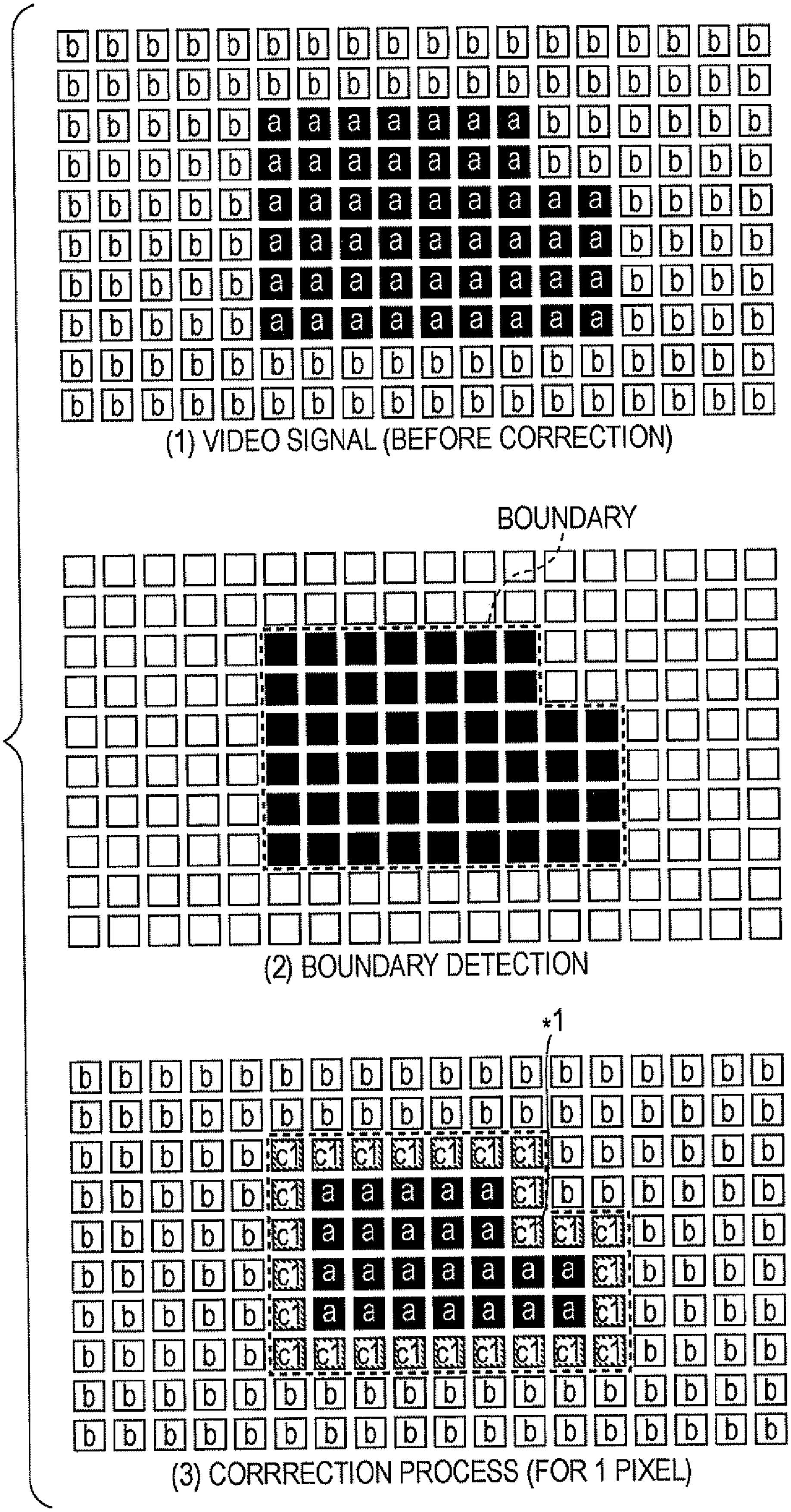
FIG. 6 is a diagram illustrating details of a correction process (for one pixel) of the video processing circuit.

In the case where the image represented by the video signal Vid-in is that illustrated in, for example, (1) of FIG. 6, the boundary detected by the boundary detection portion 302 is illustrated in (2) of FIG. 6.

In the video processing circuit 30, the pixels, of which the grayscale level is included in the grayscale range a among the pixels adjacent to the detected boundary, are replaced with the video signals having the grayscale level c1. Therefore, the image illustrated in (1) of FIG. 6 is corrected to the grayscale level as illustrated in (3) of FIG. 6 by the video processing circuit 30.

Figure 7A:
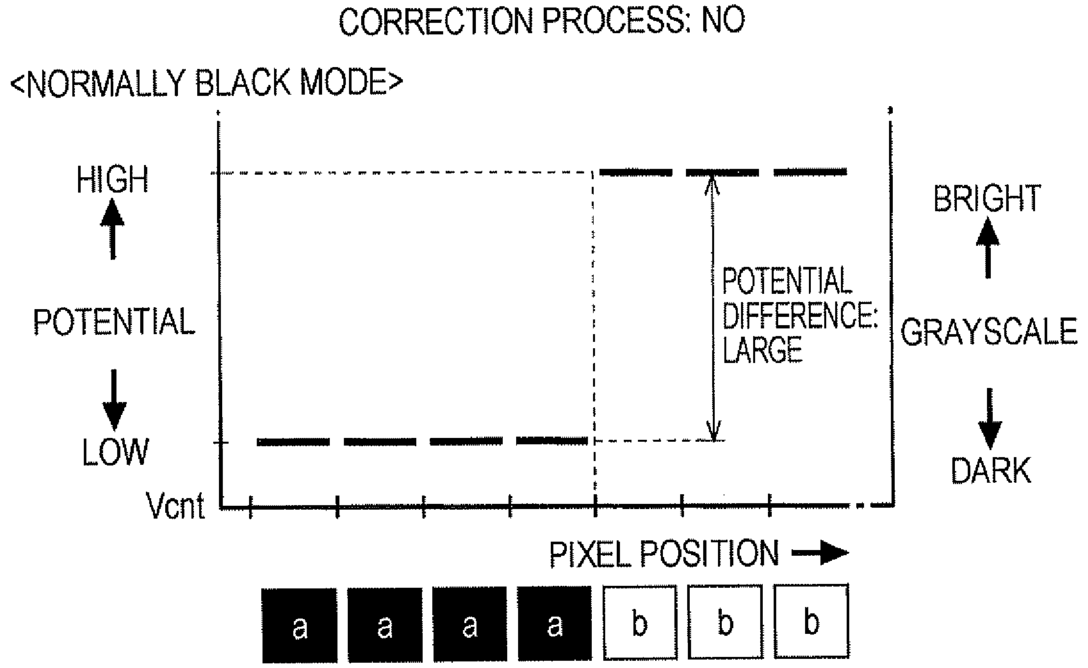
FIGS. 7A and 7B are diagrams illustrating reduction in transverse electric field caused by the correction process (for one pixel)

In the configuration where the video signal Vid-in is supplied to the liquid crystal panel 100 without the processing of the video processing circuit 30, in the dark pixel included in the grayscale range a and the bright pixel included in the grayscale range b, in the case of the positive polarity writing, the potentials of the pixel electrodes are those illustrated in FIG. 7A. Namely, although the potential of the pixel electrode of the dark pixel is lower than the potential of the pixel electrode of the bright pixel in the case of the positive polarity, since the potential difference is large, the pixel may be easily influenced by the transverse electric field.

In addition, in the case of the negative polarity, the potentials have a symmetric relationship with respect to the voltage Vc (almost the same as the voltage LCcom), and the relationship of the amplitudes of the potentials are inverted. However, since the configuration that the potential difference is large is not changed, the pixel may also be easily influence by the transverse electric field.

Figure 7B:
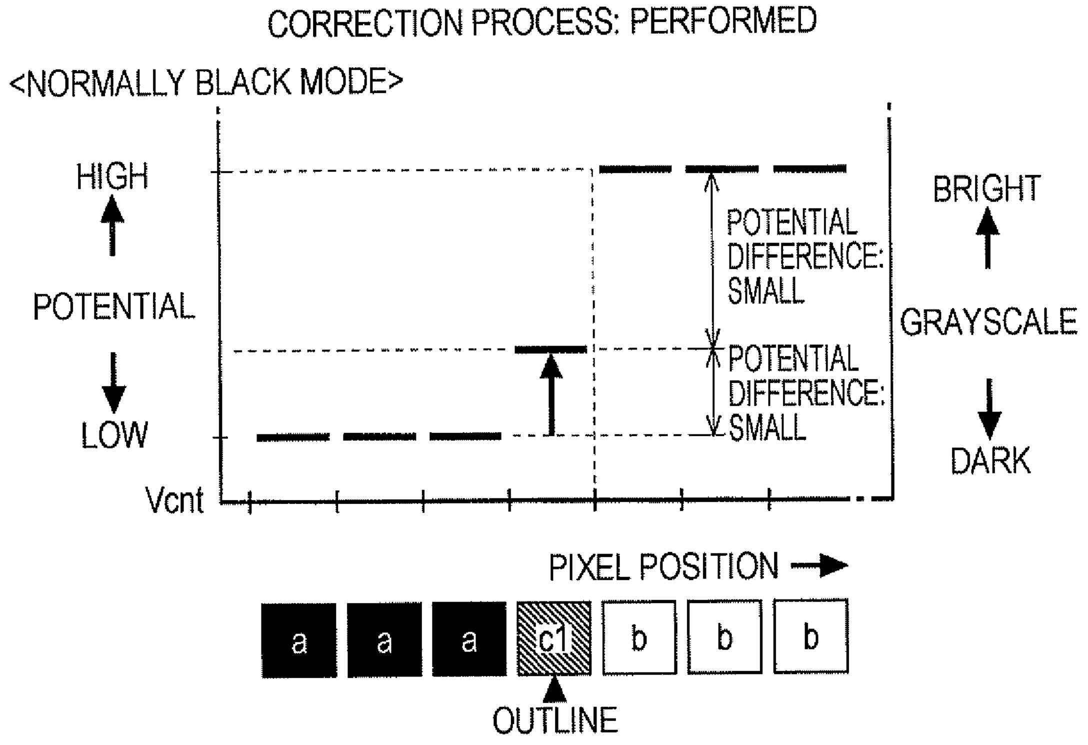

On the contrary, in the embodiment, in the image represented by the video signal Vid-in, when the dark pixel included in the grayscale range a and the bright pixel included in the grayscale range b are adjacent, since the video signal Vid-out corresponding to the dark pixel is replaced with the grayscale level c1, the applied voltage of the liquid crystal element of the dark pixel is increased. In other words, in the case of the positive polarity writing, the potential of the pixel electrode of the dark pixel is increased as illustrated in FIG. 7B.

Therefore, the potential difference between the pixel electrodes is changed stepwise, so that the influence of the transverse electric field may be suppressed so as to be small.

Figure 8A:
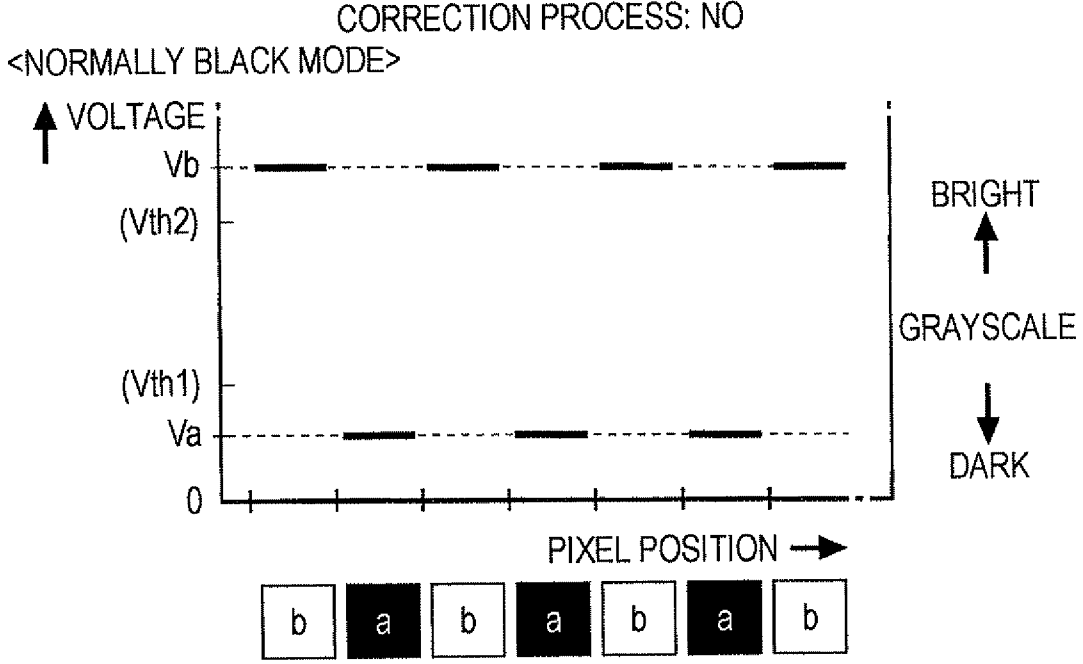
FIGS. 8A and 8B are diagrams illustrating reduction in transverse electric field caused by the correction process (for one pixel)

In addition, as illustrated in FIG. 8A, in the case where the image represented by the video signal Vid-in is an image where the dark pixels included in the grayscale range a and the bright pixels included in the grayscale range b are alternately arrayed, if there is no process of the video processing circuit 30, the applied voltage of the liquid crystal element 120 is that illustrated in the figure, so that the pixels may be easily influenced by the transverse electric field.

Figure 8B:
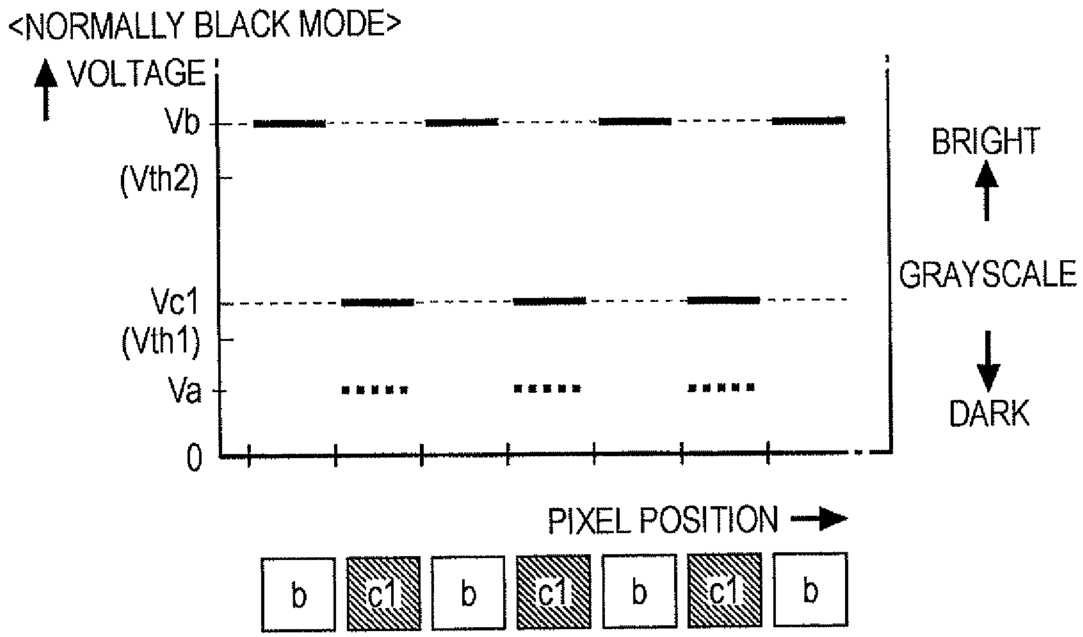

On the contrary, in the embodiment, in the configuration where the video signal Vid-in is processed by the video processing circuit 30 to be supplied to the liquid crystal panel 100, as illustrated in FIG. 8B, since the applied voltage of the liquid crystal element 120 of the dark pixel included in the grayscale range a is increased up to the voltage Vc1 corresponding to the grayscale level c1, the influence of the transverse electric field may be suppressed so as to be small.

In addition, at this time, the applied voltage of the liquid crystal element of the dark pixel is increased up to the voltage Vc1 in the direction so that the transmittance is increased (in the direction so that it is brightened).

Although the embodiment is described by employing the normally black mode where the liquid crystal 105 is configured in the VA scheme, a normally white mode where the liquid crystal 105 is configured, for example, in the TN scheme so that the liquid crystal element 120 is in the white state at the time of no voltage may be employed.

Figure 4B:
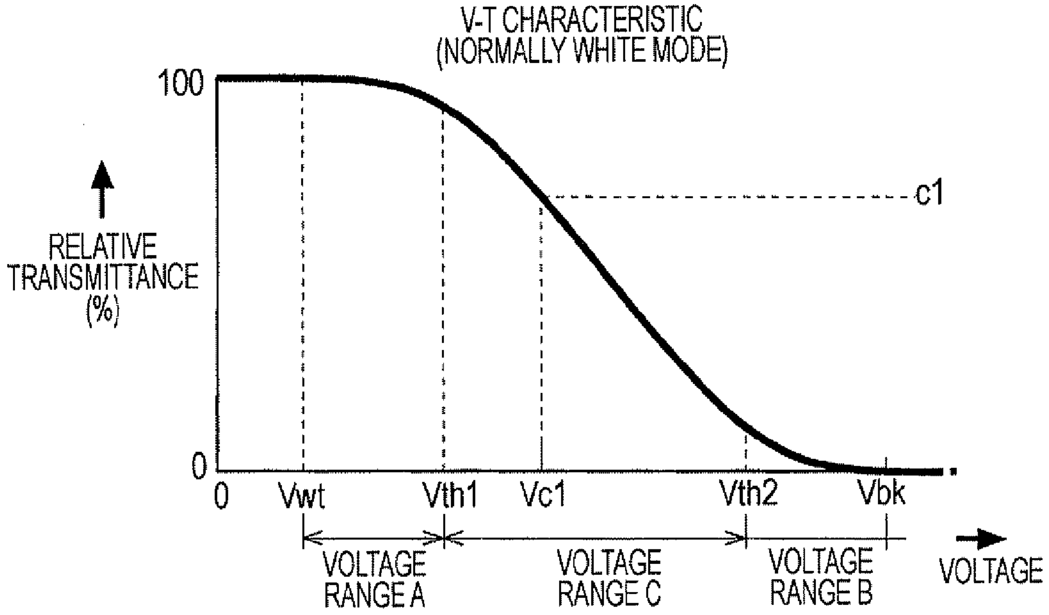

In the case where the normally white mode is employed, the relationship between the applied voltage of the liquid crystal element 120 and the transmittance is expressed by the V-T characteristic illustrated in FIG. 4B. Therefore, as the applied voltage is increased, the transmittance is decreased.

Although the configuration that the pixel influenced by the transverse electric field is the pixel having the lower applied voltage is not changed, the pixel having the lower applied voltage in the normally white mode is the bright pixel.

Therefore, in the normally white mode, in the case where the bright pixel of which the transmittance is higher than the transmittance of the time when the applied voltage is the threshold value Vth1 and the dark pixel of which the transmittance is equal to or lower than the transmittance of the time when the applied voltage is the threshold value Vth2 are adjacent, the video processing circuit 30 may perform the process of replacing the grayscale level of the bright pixel designated with the video signal Vid-in with the grayscale level c1.

Figure 9A:
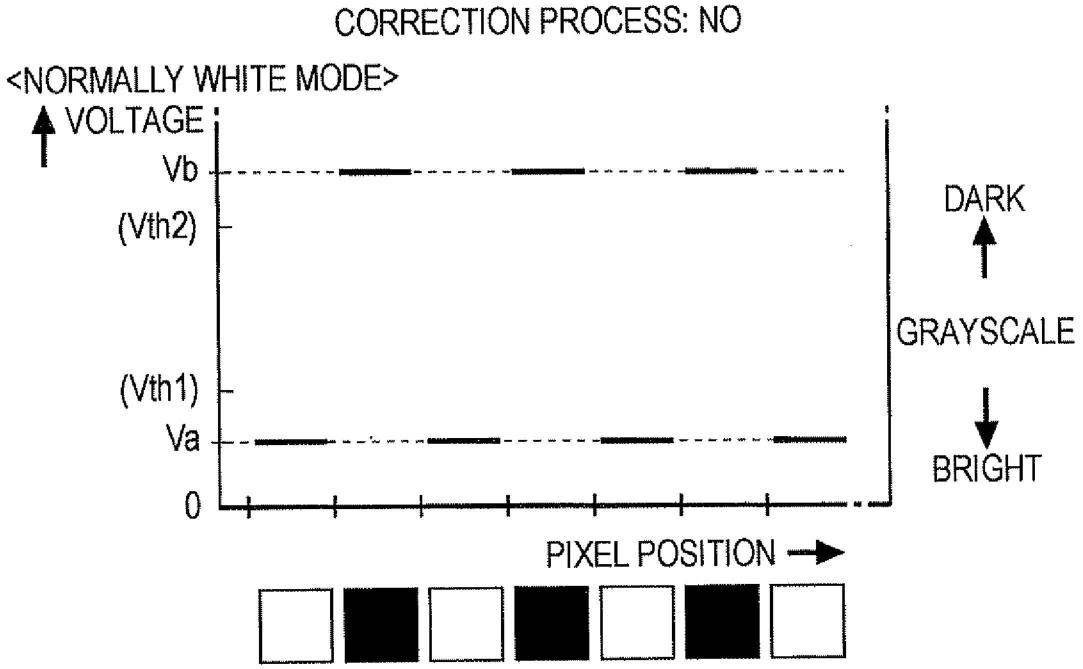
FIGS. 9A and 9B are diagrams illustrating reduction in transverse electric field caused by the correction process (for one pixel)

As illustrated in FIG. 9A, the image represented by the video signal Vid-in is the image where the bright pixels and the dark pixels are alternately arrayed, if there is no correction process of the video processing circuit 30, the applied voltage of the liquid crystal element 120 is that illustrated in the figure, so that the pixels may be easily influenced by the transverse electric field similarly.

Figure 9B:
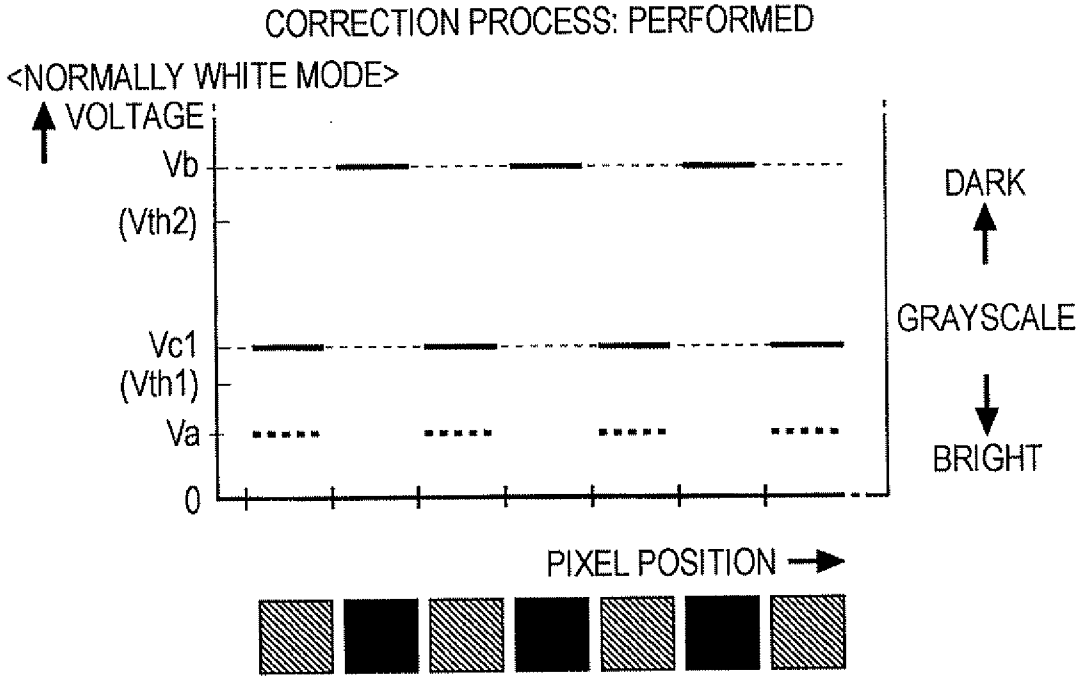

On the contrary, in the configuration where the video signal Vid-in is processed by video processing circuit 30 to be supplied to the liquid crystal panel 100, as illustrated in FIG. 9B, since the applied voltage of the liquid crystal element 120 of the bright pixel is increased up to the voltage Vc1 corresponding to the grayscale level c1, the influence of the transverse electric field may be suppressed so as to be small.

At this time, the applied voltage of the liquid crystal element of the bright pixel is increased up to the voltage Vc1, so that the transmittance is changed in the direction so that the transmittance is to be decreased (in the direction so that it is darkened).

In this manner, according to the embodiment, it is possible to prevent the occurrence of the defects in the display caused by the aforementioned reverse tilt domain in advance. In addition, in the image defined by the video signals Vid-in, since the pixel adjacent to the boundary is locally replaced with the grayscale level of the pixel adjacent to the boundary, the possibility that the change in the displayed image due to the replacement may be perceived by the user is lowered. In the embodiment, since the structure of the liquid crystal panel 100 may not have to be changed, it is possible to employ a liquid crystal panel that is already manufactured without decrease in the aperture ratio and without contrivance of the structure.

In addition, in (3) of FIG. 6, although the dark pixel indicated by #1 is replaced with the grayscale level c1 by taking into consideration that the pixel is adjacent to the boundary, since the dark pixels are at the diagonal positions, the influence of the transverse electric field is considered to be small. Therefore, there may be provided a configuration of no replacement with the grayscale level c1.

Applied Modified Examples of First Embodiment

Various applications and modifications of the aforementioned first embodiment may be implemented.

<1>

In the aforementioned first embodiment, there is provided the configuration, by the analysis of the video signal Vid-in, when the dark pixel and the bright pixel are adjacent, the applied voltage of the liquid crystal element 120 is increased by replacing the one pixel (the dark pixel in the normally black mode), of which the applied voltage is to be decreased, among the two pixels with the grayscale level c1 included in the grayscale range c. In such a configuration, due to the replacement with the grayscale level c1, there is a problem in that the boundary between the dark pixel and the bright pixel is shifted from the boundary included in the video signal Vid-in, so that the boundary may be viewed by the user.

Therefore, an applied modified example (1) of the first embodiment, of correcting the two pixels adjacent to the boundary in order to suppress the problem of the boundary to be viewed due to the shifting of the boundary as well as to prevent the occurrence of the defects in the display caused by the reverse tilt domain is described.

Figure 10:
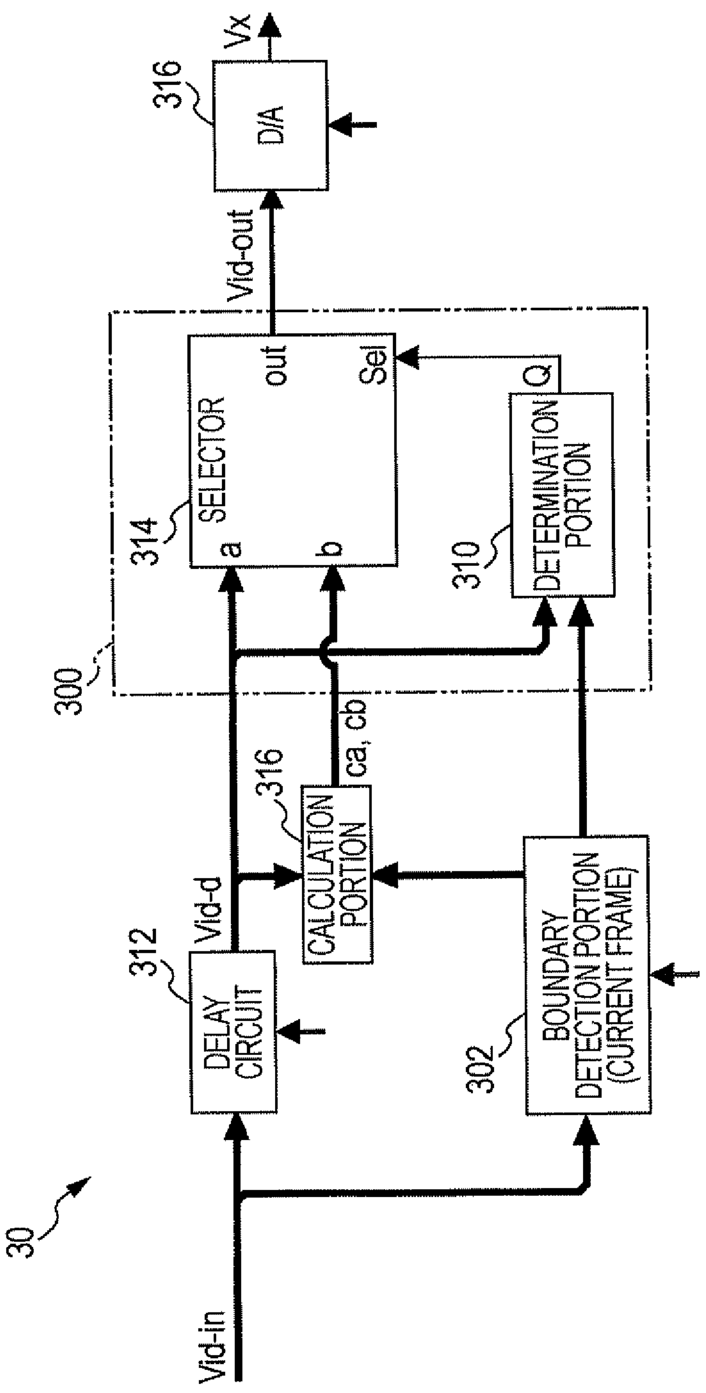
FIG. 10 is a diagram illustrating a configuration of another video processing circuit according to the first embodiment.

FIG. 10 is a block diagram illustrating a configuration of a video processing circuit according to an applied modified example of the first embodiment. The configuration illustrated in FIG. 10 is different from the configuration illustrated in FIG. 3 in that a calculation portion 315 is added and in that details of the determination of the determination portion 310 are changed.

More specifically, when the normally black mode is employed as an example, in the case where the pixel corresponding to the delayed video signal Vid-d is adjacent to the boundary detected by the boundary detection portion 302, firstly if the pixel is a dark pixel, the calculation portion 315 outputs the grayscale level ca, and secondly if the pixel is a bright pixel, the calculation portion 315 calculates and outputs the grayscale level cb. In addition, the calculation portion 315 calculates the grayscale level cb from the grayscale level of the bright pixel designated with the video signal Vid-d, the grayscale level of the opposite dark pixel with respect to the interposed boundary, and the grayscale level ca.

The grayscale level ca is a grayscale level which allows the applied voltage of the liquid crystal element to be the Vca in the voltage range C when the data signal converted by the data line driving circuit 140 is applied to the pixel electrode. In addition, the grayscale level cb calculated by the calculation portion 315 is a grayscale level which allows the information of the boundary between the dark pixel and the bright pixel in the signal Vid-in to be maintained by replacing the dark pixel with the grayscale level ca and replacing the bright pixel with the grayscale level cb in the case where the dark pixel and the bright pixel are adjacent in the video signal Vid-in and is a grayscale level which allows the applied voltage of the liquid crystal element applied to the bright pixel to be the voltage Vcb which is higher than the applied voltage Vca.

Figure 3:
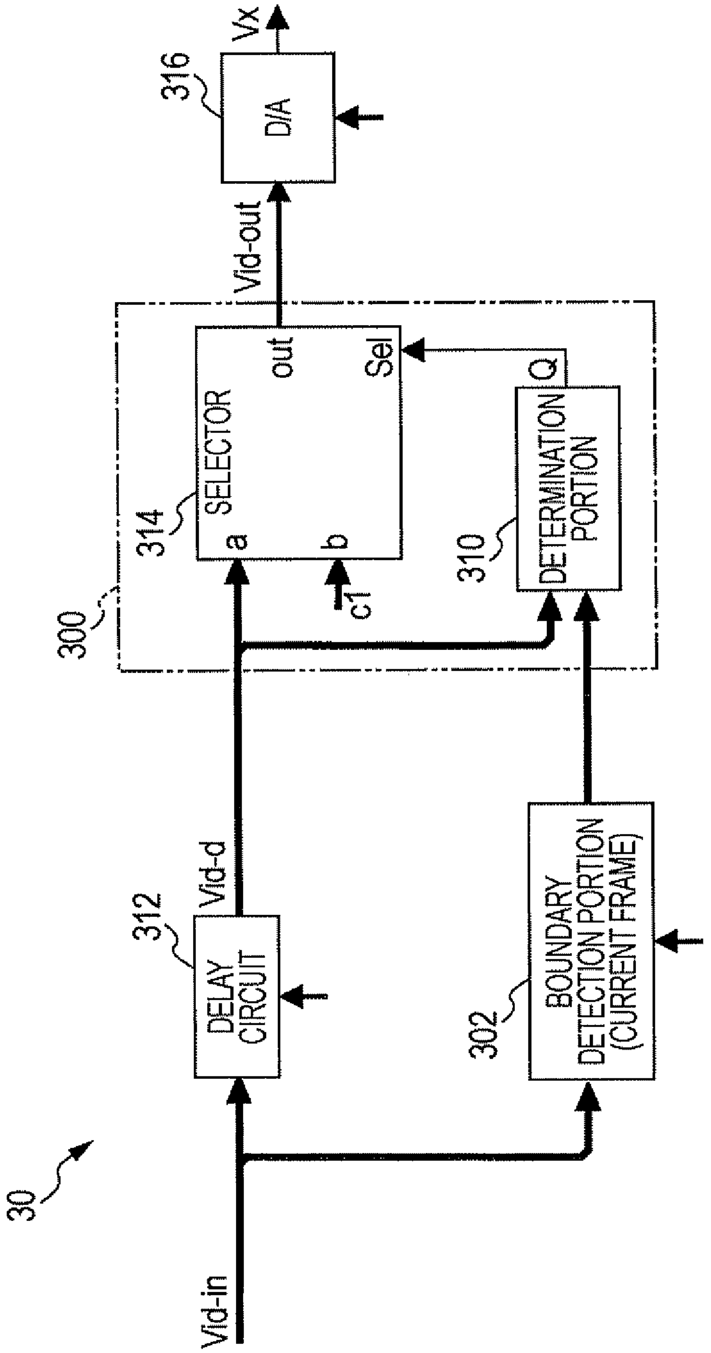
FIG. 3 is a diagram illustrating a configuration of the video processing circuit.

Unlike FIG. 3, the determination portion 310 illustrated in FIG. 10 performs only the second determination, that is, determines whether or not the pixel represented by the delayed video signal Vid-d is adjacent to the boundary detected by the boundary detection portion 306. The determination portion 310 is the same as that of FIG. 3 in that, if the determination result is "Yes", the flag Q of the output signal is set to "1", and if the determination result is "No", the flag Q is set to "0".

In such a configuration, if the flag Q is "1", it denotes that the pixel of the video signal Vid-d is adjacent to the boundary. If the flag Q is "1", the selector 314 selects the input terminal b. Therefore, the video signal Vid-d is corrected to (replaced with) a grayscale level output from the calculation portion 315 and output as a video signal Vid-out.

Although a dark pixel included in the voltage range A (grayscale level a) and a bright pixel included in the voltage range B (grayscale level b) are adjacent to the detected boundary, in the case of the dark pixel, the calculation portion 315 outputs the grayscale level ca, and in the case of the bright pixel, the calculation portion 315 calculates and outputs the grayscale level cb.

A detailed example of the correction process of the video processing circuit 30 illustrated in FIG. 10 is described.

Figure 11:
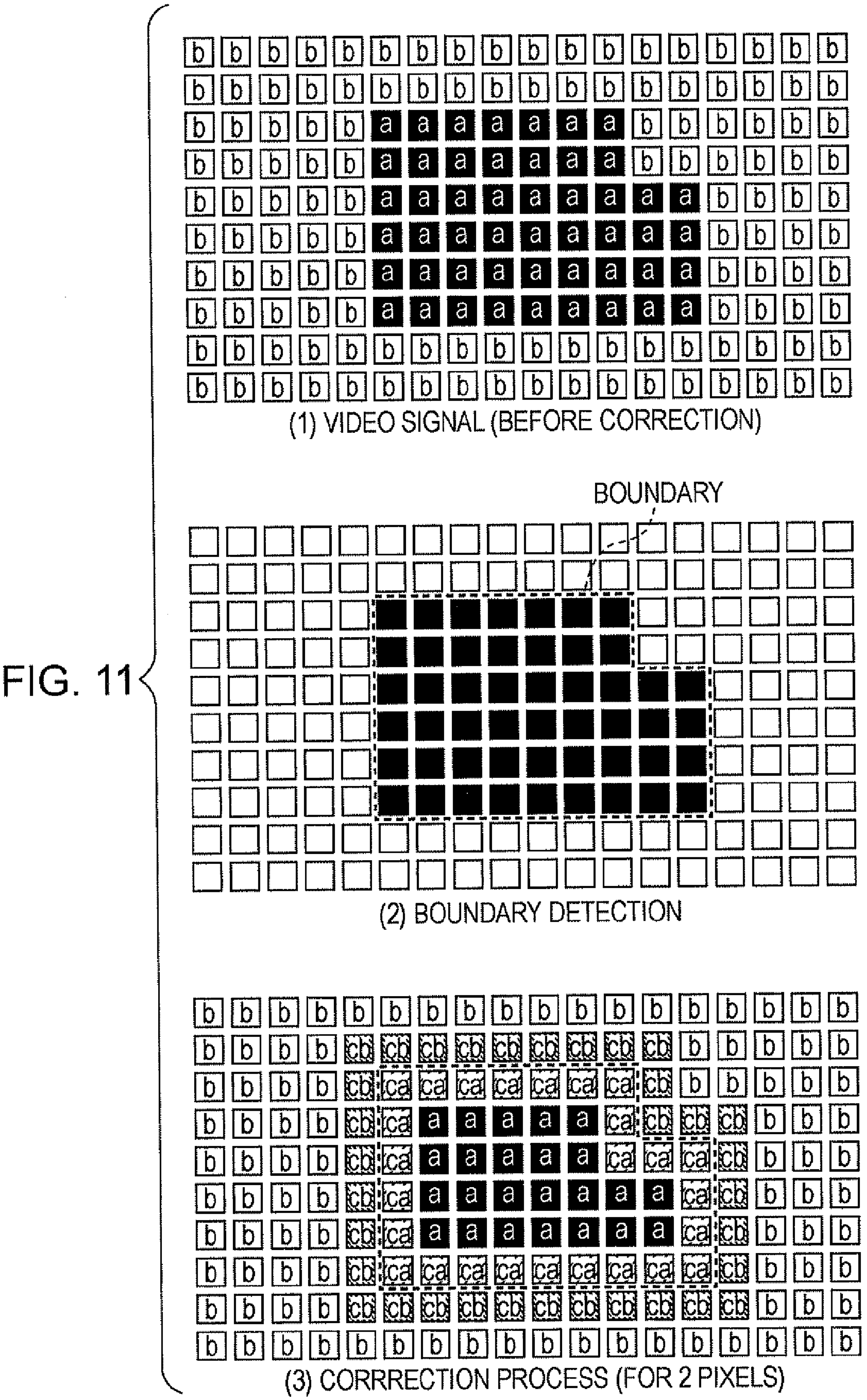
FIG. 11 is a diagram illustrating details of a correction process (for two pixels) of the video processing circuit.

In the case where the image represented by the video signal Vid-in is the same as that illustrated in, for example, (1) of FIG. 11, the boundary detected by the boundary detection portion 302 is that illustrated in (2) of FIG. 11. The configuration described hereinbefore is the same as the video processing circuit illustrated in FIG. 3.

In the video processing circuit 30 illustrated in FIG. 10, in the case where the pixel corresponding to the delayed video signal Vid-d is adjacent to the boundary, if the pixel is a dark pixel, the video signal Vid-d is replayed with the grayscale level ca, and if the pixel is a bright pixel, the video signal Vid-d is replaced with the grayscale level cb. Therefore, the image illustrated in (1) of FIG. 10 is corrected to the grayscale level illustrated in (3) of FIG. 10 by the video processing circuit 30.

There is assumed a state that, in a portion of the 1st row of the image represented by the video signal Vid-in, the dark pixels included in the grayscale range a and the bright pixels included in the grayscale range b are arrayed as illustrated in 12A.

In the video processing circuit illustrated in FIG. 3, since the dark pixel adjacent to the boundary is moved to the grayscale level c1, as illustrated in FIG. 7B, the outline between the dark pixel and the bright pixel viewed by user is shifted toward the dark pixel.

Figure 12A:
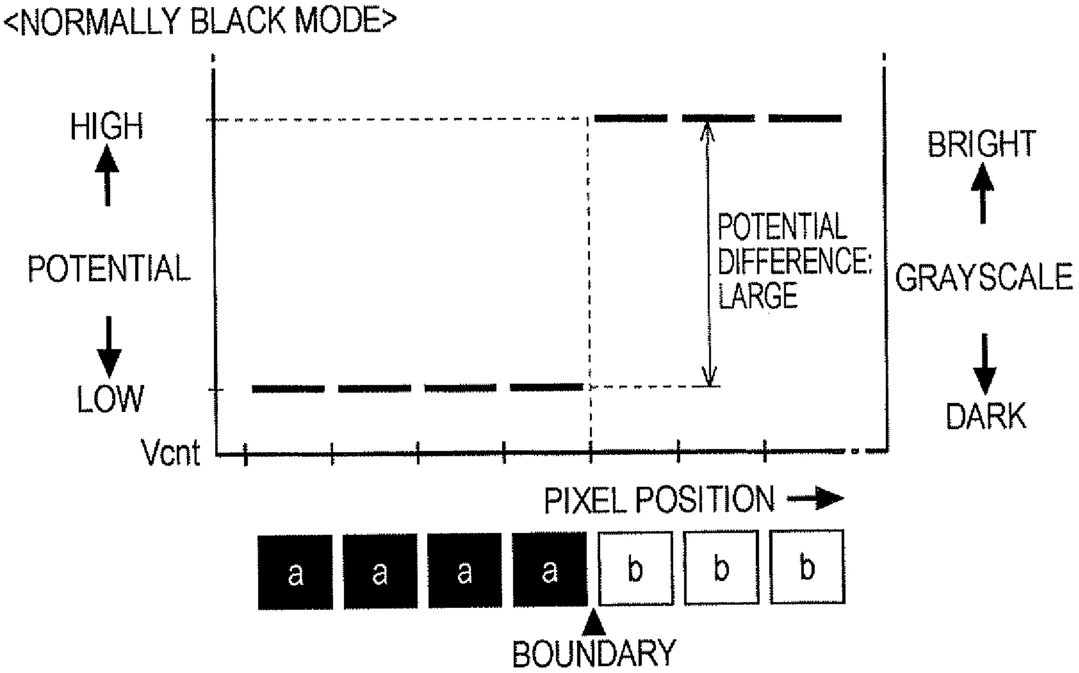
FIGS. 12A and 12B are diagrams illustrating reduction in transverse electric field caused by the correction process (for two pixels)
Figure 12B:
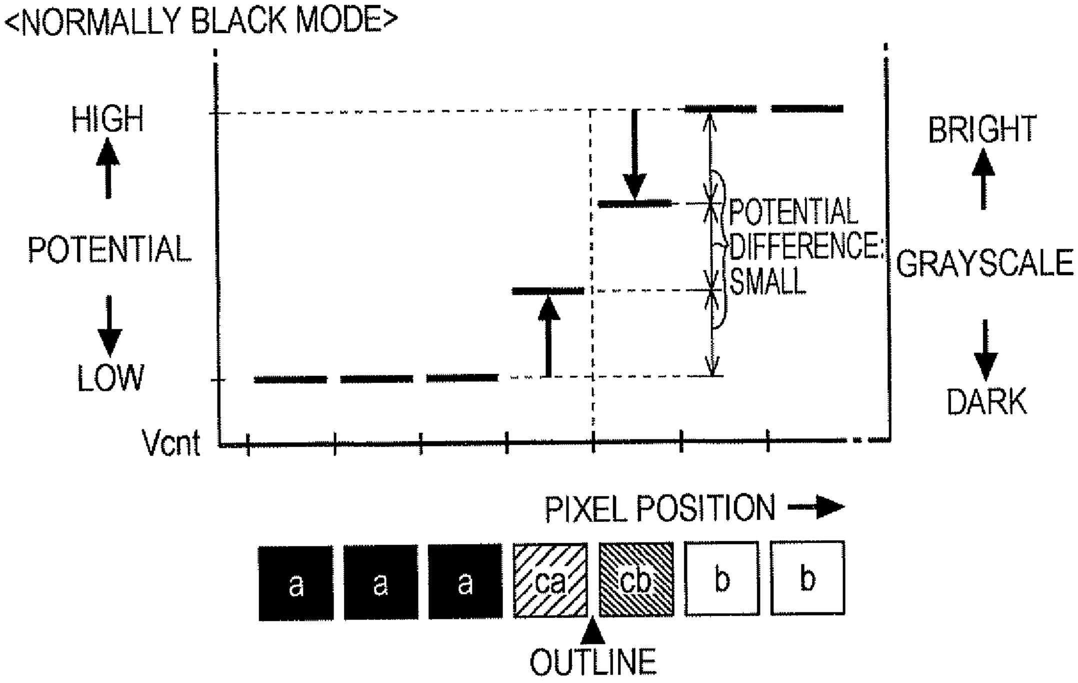

On the contrary, in the video processing circuit 30 according to the applied modified example illustrated in FIG. 10, the dark pixel adjacent to the boundary is replaced with the grayscale level ca in the direction so that the pixel is to be brightened. Therefore, in the case of the positive polarity writing, the potential of the pixel electrode is increased as illustrated in FIG. 12B. In addition, the bright pixel adjacent to the boundary is replaced with the grayscale level cb so that the pixel is to be darkened. Therefore, in the case of the positive polarity writing, the potential of the pixel electrode is decreased as illustrated in FIG. 12B. When the pixel is replaced with the grayscale level cb, in the case of the positive polarity writing, since the potential of the pixel electrode is lower than the increased potential of the dark pixel, the portion of the outline of the dark pixel and the bright pixel viewed by the user is not almost shifted as illustrated in FIG. 12B.

Therefore, in the video processing circuit according to the applied modified example of the first embodiment, it is possible to prevent the occurrence of the defects in the display caused by the reverse tilt domain in advance and to suppress the shifting of the outline portion viewed by the user from the image represented by the video signal Vid-in.

In addition, once the reverse tilt domain occurs, there is a tendency in that spreading occurs over the portion having a weak longitudinal electric field. Therefore, with respect to the pixels near the boundary having a strong transverse electric field, it is preferable that the correction is performed over as many pixels as possible such that two pixels are better than one pixel, and three or more pixels are better than two pixels.

<2>

In the aforementioned first embodiment, by the analysis of the video signal Vid-in, when the dark pixel and the bright pixel are adjacent, the correction is made so that the applied voltage of the liquid crystal element 120 is increased by replacing the pixel having the lower applied voltage with the grayscale level c1 included in the grayscale range c, so that the transverse electric field is decreased.

Alternatively, in order to decrease the transverse electric field, the applied voltage of the pixel having the higher applied voltage may be considered to be deceased.

For this reason, the determination portion 310 according to the first embodiment determines whether or not the grayscale level of the pixel represented by the video signal Vid-d is include in the grayscale range b of the bright pixel and determines whether or not the pixel is adjacent to the boundary (second determination). If both determination results are "Yes", a flag Q of an output signal may be configured to be set to "1", and a video signal having grayscale level cc may be configured to be supplied to an input terminal b of the selector 314 as a replacement signal.

Figure 13A:
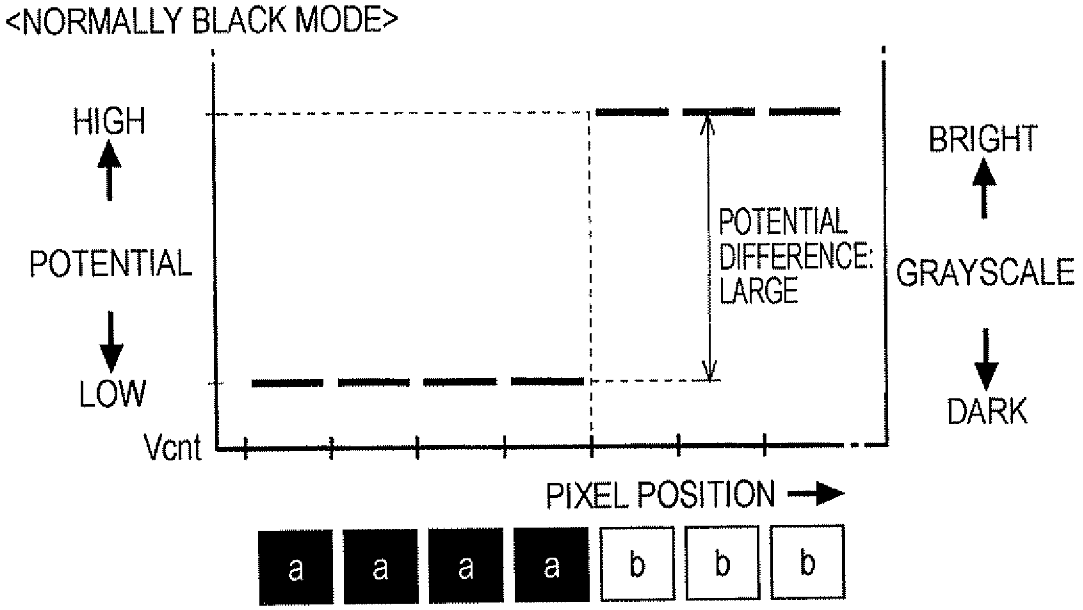
FIGS. 13A and 13B are diagrams illustrating details of still another correction process according to the first embodiment.

If the video signal Vid-in is configured to be supplied to the liquid crystal panel 100 without the processing of the video processing circuit 30, in the dark pixel included in the grayscale range a and the bright pixel included in the grayscale range b, the potential of the pixel electrode is that illustrated in FIG. 13A in the case of the positive polarity writing, so that the transverse electric field between the dark pixel and the bright pixel is increased.

Figure 13B:
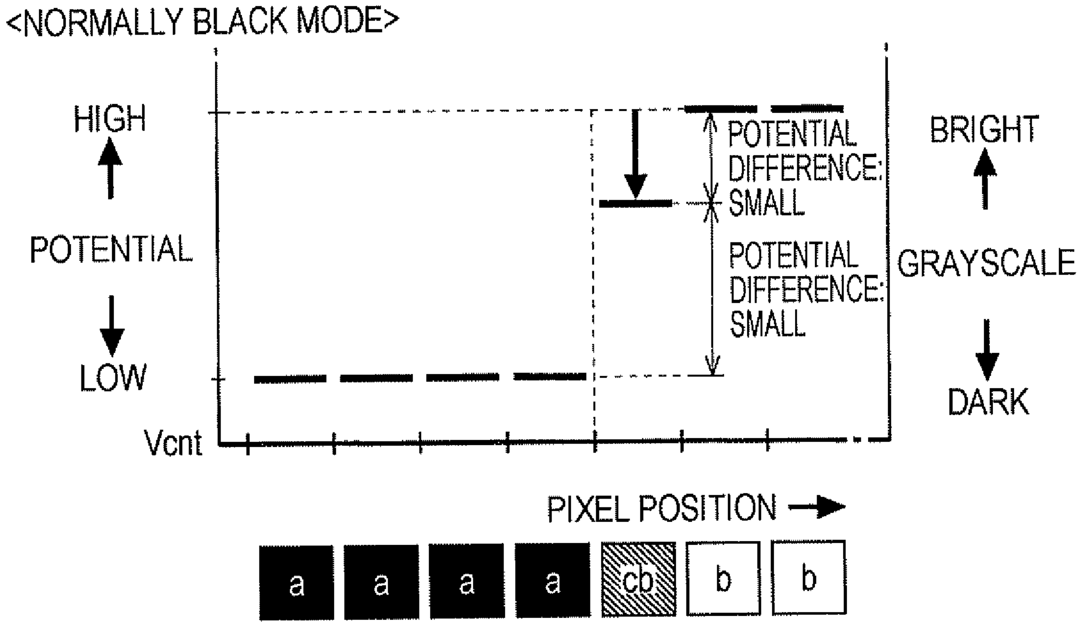

However, in the example, as shown in FIG. 13B, since the correction is performed so that the applied voltage of the liquid crystal element of the bright pixel is lowered, it is possible to suppress and reduce the influence of the transverse electric field.

Second Embodiment

In the aforementioned first embodiment including the applied modified examples, the process is finished in one frame of the image represented by the video signal Vid-in. However, in the case where the image is involved with movement, the pixel which is adjacent to the boundary in the frame (current frame) represented by the video signal Vid-in supplied from an upper-level apparatus may not have to be corrected in consideration of the movement in the one frame (preceding frame) preceding the current frame.

Next, a video processing circuit according to a second embodiment, where a state of the preceding frame is considered in the correction of the current frame, is described.

Figure 14:
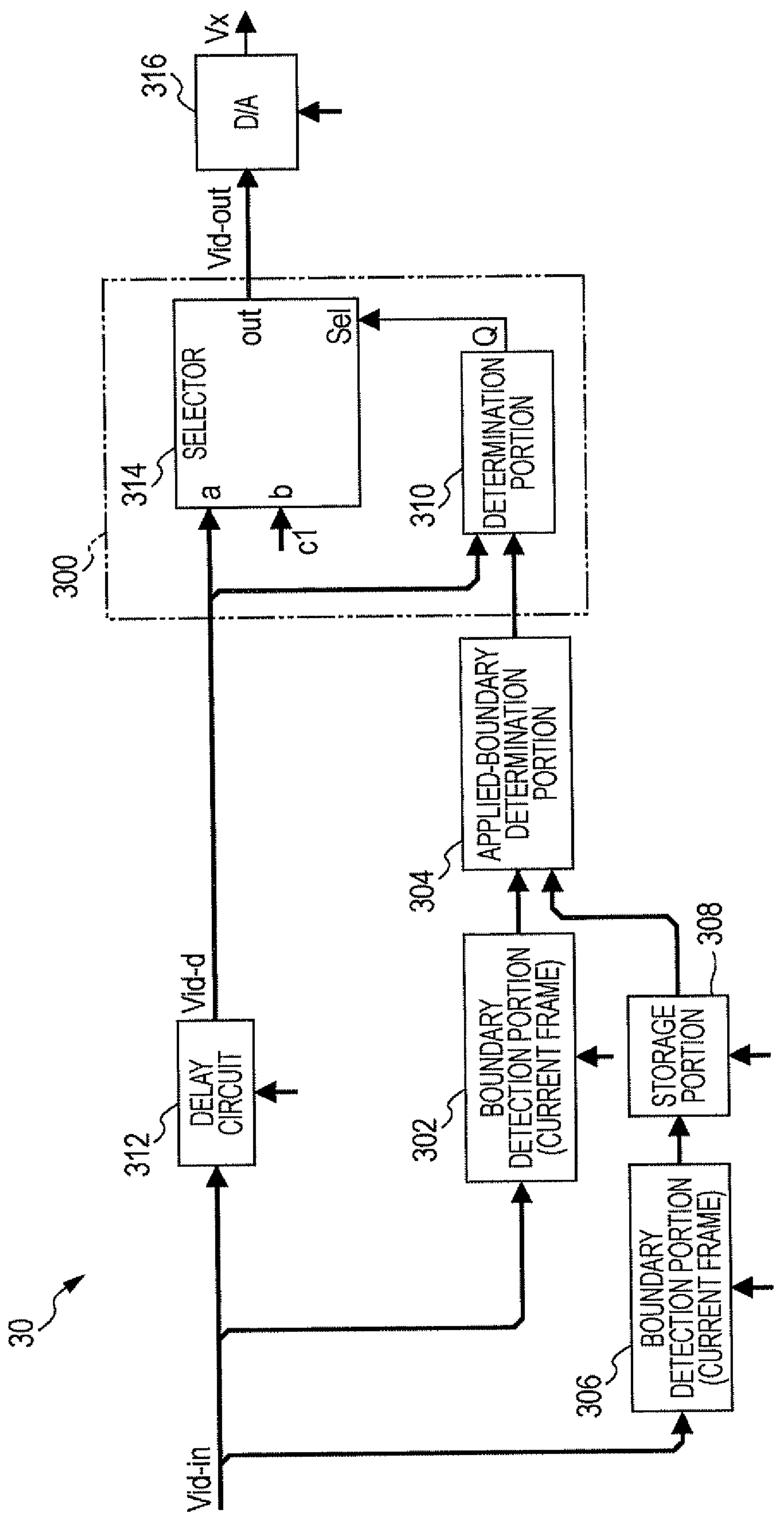
FIG. 14 is a diagram illustrating a configuration of a video processing circuit according to a second embodiment of the invention.

FIG. 14 is a block diagram illustrating a configuration of the video processing circuit according to the second embodiment.

By comparing the configuration illustrated in FIG. 14 with the configuration illustrated in FIG. 3, the configuration illustrated in FIG. 14 is different from the configuration illustrated in FIG. 3 in that an applied-boundary determination portion 304, a boundary detection portion 306, and a storage portion 308 are added and in that details of the determination of the determination portion 310 are changed.

In addition, although the boundary detection portion 302 is the same as that illustrated in FIG. 3, the boundary detection portion 302 corresponds to the first boundary detection portion in terms of processing the video signal Vid-in of the current frame.

In addition, the boundary detection portion 306 analyzes an image represented by the video signal Vid-in and detects portions, to which the pixel in the grayscale range a and the pixel in the grayscale range b are adjacent, as a boundary.

The storage portion 308 stores information on the boundaries detected by the boundary detection portion 306 and outputs the information after the delay of one frame interval.

Therefore, the boundaries detected by the boundary detection portion 302 relate to the current frame, but the boundaries detected by the boundary detection portion 306 and stored in the storage portion 308 relate to the one frame preceding the current frame. For this reason, the boundary detection portion 306 corresponds to the second boundary detection portion.

The applied-boundary determination portion 304 determines a boundary, which is obtained by excluding a portion the same as the boundary of an image of the preceding frame stored in the storage portion 308 from the boundary of an image of the current frame detected by the boundary detection portion 306, as an applied boundary.

The determination portion 310 determines whether or not the grayscale level of the pixel represented by the delayed video signal Vid-d is included in the grayscale range a and determines whether or not the pixel is adjacent to the applied boundary determined by the applied-boundary determination portion 304. If both determination results are "Yes", a flag Q of an output signal is set to, for example, "1". If any one of the determination results is "No", the flag Q is set to "0".

In the configuration, if the flag Q is "1", it denotes that the pixel corresponding to the delayed video signal Vid-d is included in the grayscale range a and is adjacent to the boundary in the current frame but not adjacent to the boundary in the one preceding frame. If the flag Q is "1", the selector 314 selects the input terminal b, so that the video signal Vid-d of the current frame is replaced by the video signal designating the grayscale level c1 to be output as the video signal Vid-out.

On the other hand, if the flag Q is "0", it denotes that the pixel corresponding to the delayed video signal Vid-d is (a) not included in the grayscale range a or (b) included in the grayscale range a, adjacent to the boundary in the current frame, and adjacent to the boundary in the one preceding frame. If the flag Q is "0", the video signal Vid-d supplied to the input terminal a is output as the video signal Vid-out.

A detailed example of the correction process of the video processing circuit 30 illustrated in FIG. 14 is described.

Figure 15:
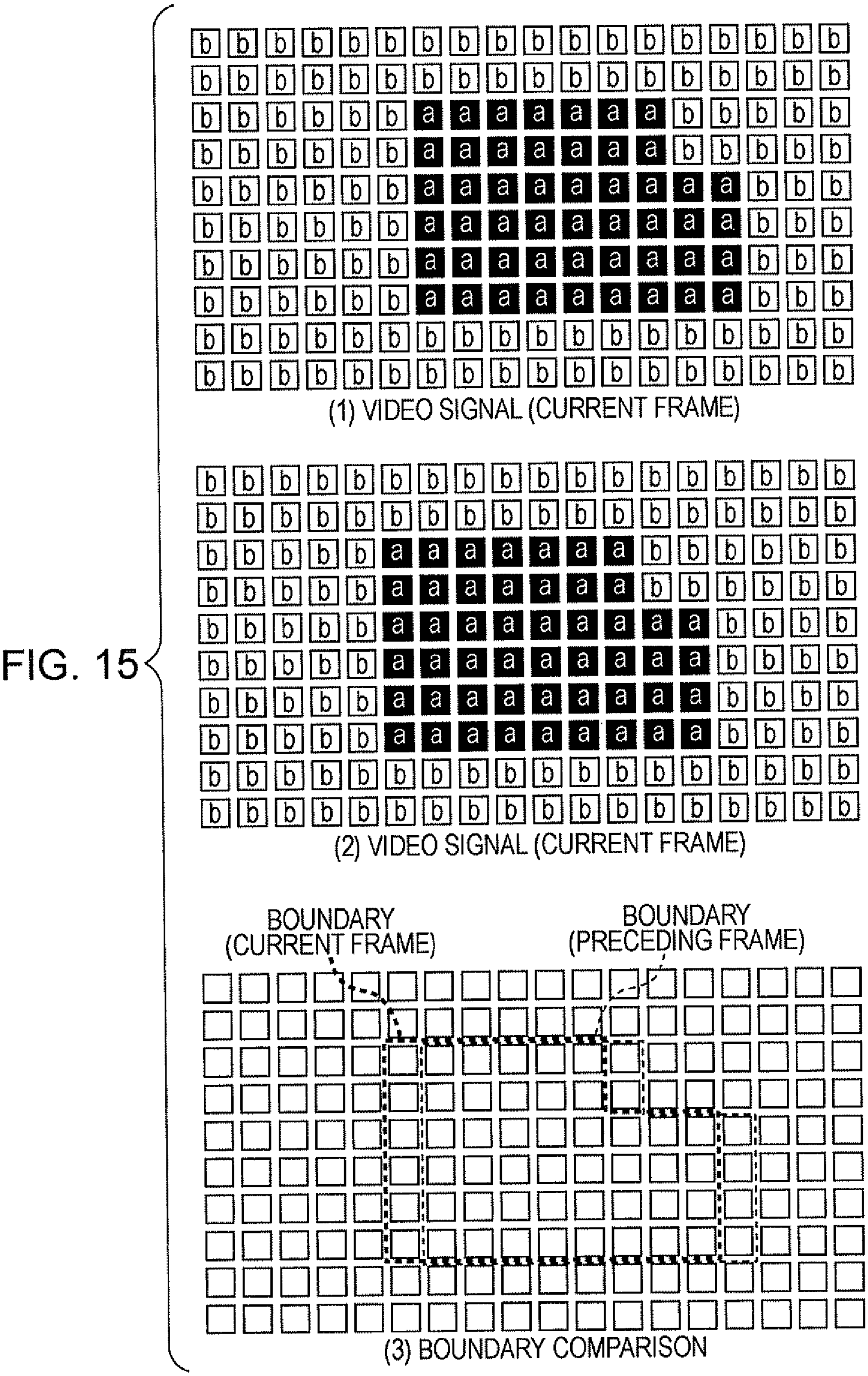
FIG. 15 is a diagram illustrating details of a correction process of the video processing circuit.

In the case where the image represented by the video signal of the one frame preceding the current frame is that illustrated in, for example, (1) of FIG. 15 and the image represented by the video signal Vid-in of the current frame is that illustrated in, for example, (2) of FIG. 15, that is, in the case where the pattern of the dark pixels in the grayscale range a is moved in the left direction with respect to the bright pixels in the grayscale range b as a background, the boundary of the image of the preceding frame which is detected by the boundary detection portion 306 and stored in the storage portion 308 and the boundary of the image of the current frame which is detected by the boundary detection portion 302 are those illustrated in (3) of FIG. 15.

Figure 16:
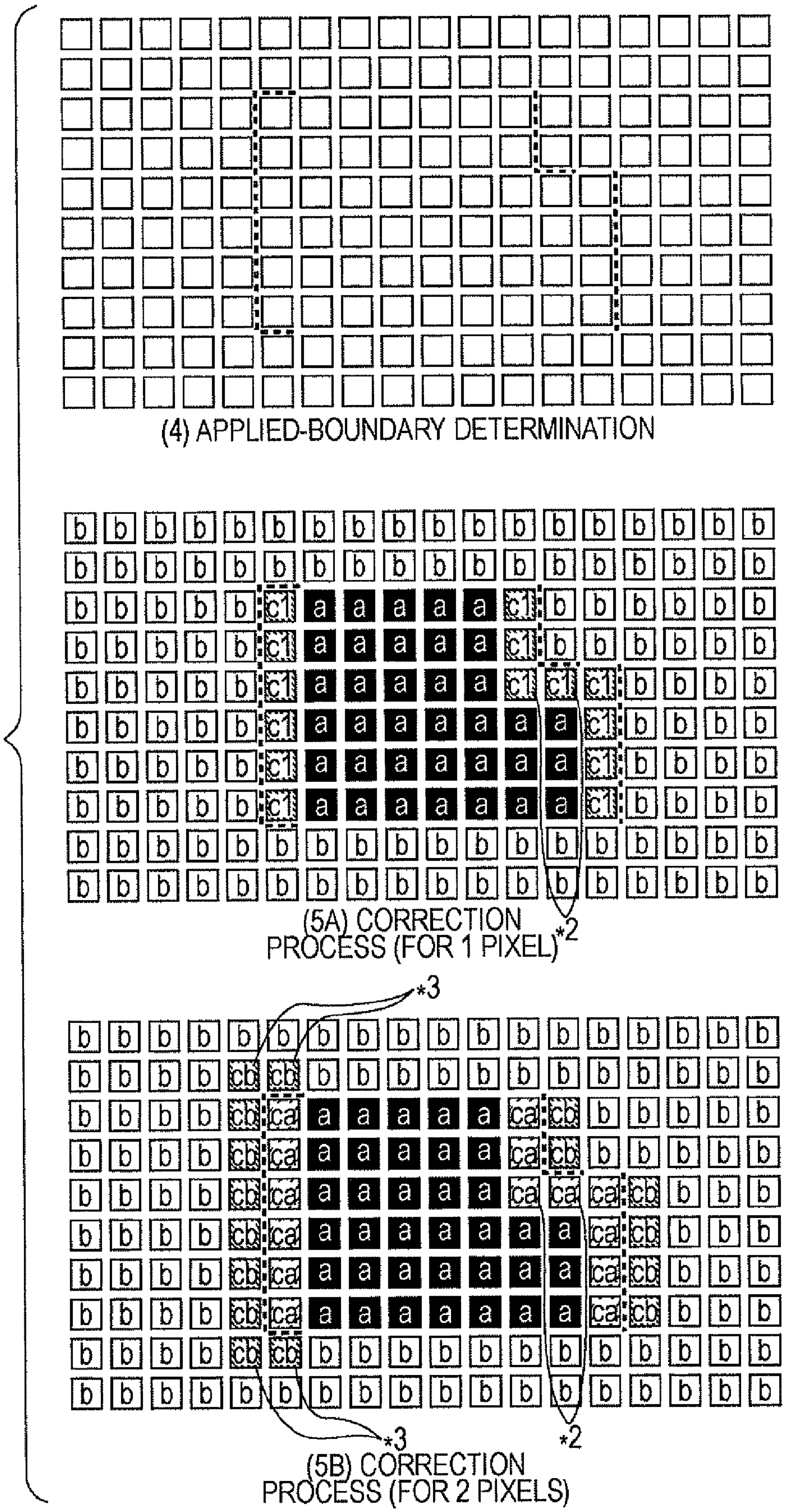
FIG. 16 is a diagram illustrating details of the correction process of the video processing circuit.

Therefore, the applied boundary determined by the applied-boundary determination portion 304 is illustrated in (4) of FIG. 16.

In the video processing circuit 30 according to the second embodiment, a dark pixel, which is adjacent to a portion changed from the boundary in the preceding frame among the boundaries between the dark pixel and the bright pixel in the current frame, is replaced with a grayscale level c1 and output as a video signal Vid-out.

Therefore, the image illustrated in (2) of FIG. 15 is corrected to the grayscale level illustrated in (5*a*) of FIG. 16 by the video processing circuit 30 according to the second embodiment.

The degradation of the display quality caused by the reverse tilt domain is considered to occur as follows. (1) In the case where the dark pixel and the bright pixel are adjacent to the liquid crystal panel 100, the alignment state in the pixel having the lower applied voltage among the dark pixel and the bright pixel is disturbed due to the influence of the transverse electric field (from the pixel having the higher applied voltage), so that the degradation occur. (2) In the case where the applied voltage is changed, the liquid crystal element does not have transmittance according to the after-change applied voltage, so that the degradation occurs.

In the first embodiment, there is provided the configuration of detecting the case (1) where the dark pixel and the bright pixel are adjacent among the above cases by analyzing the video signal Vid-in and performing correction of uniformly increasing the applied voltages of the dark pixels in the normally black mode. However, since the correction of the applied voltage of the liquid crystal element, that is, the replacement of the grayscale level denotes the loss of information included in the video signal Vid-in supplied from the upper-level apparatus, it is desired that such loss is suppressed if possible.

According to the second embodiment, even in the dark pixel adjacent to the bright pixel in the current frame, since the applied voltage of the dark pixel adjacent to a portion where the boundary between the dark pixel and the bright pixel is not changed from the boundary in the preceding frame is not greatly changed and since the boundary is not moved, there is provided a configuration of no replacement with the grayscale level c1.

On the other hand, in the second embodiment, with respect to the dark pixel adjacent to the boundary which is newly generated by the comparison with the preceding frame, that is, with respect to the dark pixel of which the applied voltage is changed from the preceding frame of the case (2) among the dark pixel and the bright pixel of the case (1), since the dark pixel is influenced by the transverse electric field due to the new boundary, there is provided a configuration of replacement with the grayscale level c1.

Therefore, in the second embodiment, in comparison with the first embodiment, the same advantage may be obtained in terms of preventing degradation of the display quality caused by the reverse tilt domain, and since the number of replacements of the grayscale level is lowered, it is possible to reduce loss of the information contained in the video signal Vid-in.

In addition, in (5*a*) of FIG. 16, although the pixel indicated by #2 is replaced with the grayscale level c1 by taking into consideration that the pixel is adjacent to the applied boundary, in this example, since the pattern of the dark pixels is moved in the horizontal direction or since the dark pixels are at the diagonal positions with respect to the bright pixels, the influence of the transverse electric field is considered to be small. Therefore, with respect to the pixel indicated by #2, there may be provided a configuration of no replacement with the grayscale level c1.

Applied Modified Example of Second Embodiment

Similarly to the applied modified example of the first embodiment, in the second embodiment, it is possible to correct two pixels adjacent to the applied boundary.

Figure 17:
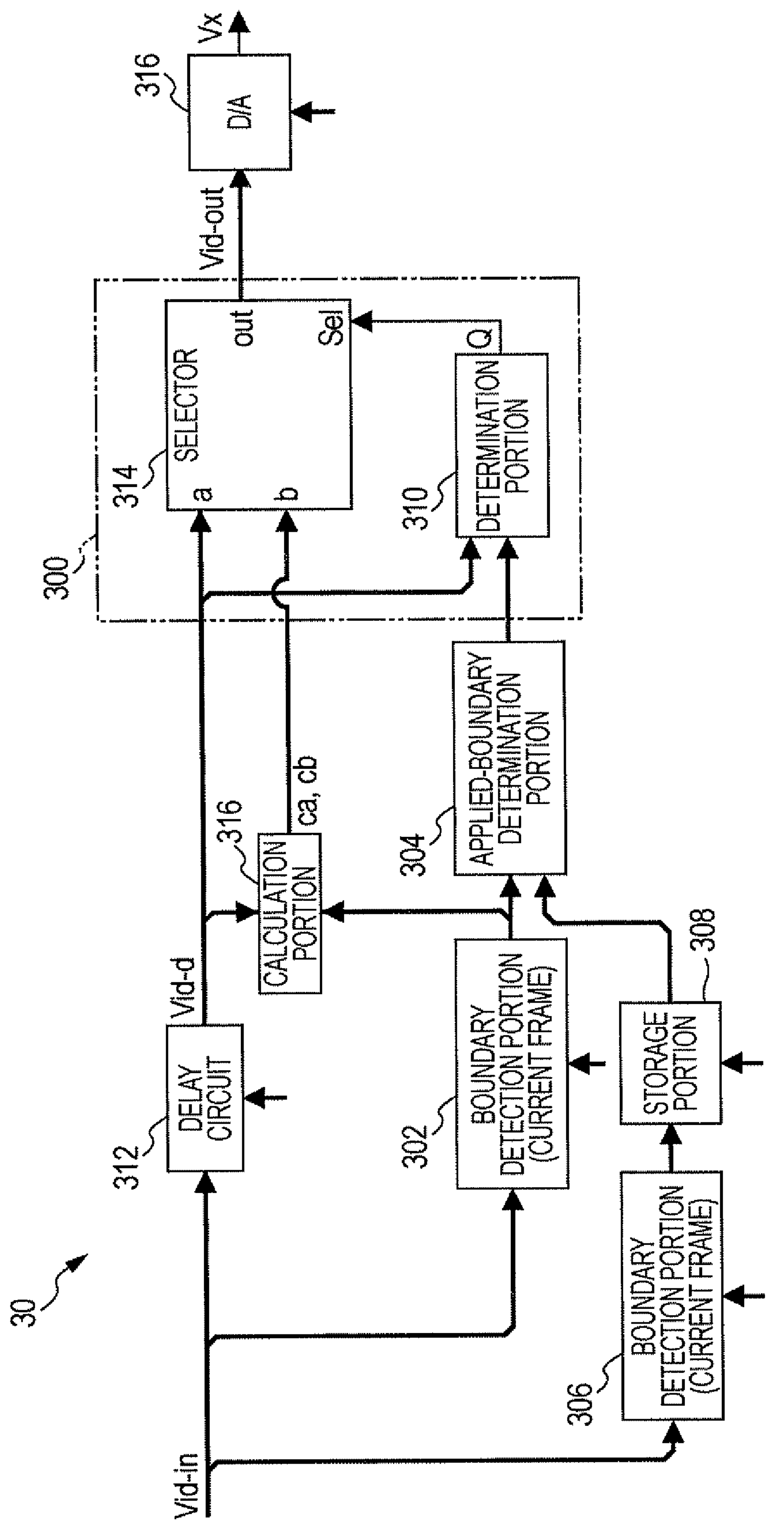
FIG. 17 is a diagram illustrating a configuration of another video processing circuit according to the second embodiment of the invention.

FIG. 17 is a block diagram illustrating a configuration of a video processing circuit according to an applied modified example of the second embodiment. The configuration illustrated in FIG. 17 is different from the configuration illustrated in FIG. 13 in that a calculation portion 315 is added and in that details of the determination of the determination portion 310 are changed.

More specifically, when the normally black mode is employed as an example, in the case where the pixel corresponding to the delayed video signal Vid-d is adjacent to the applied boundary determined by the applied-boundary determination portion 304, firstly if the pixel is a dark pixel, the calculation portion 315 outputs the grayscale level ca, and secondly if the pixel is a bright pixel, the calculation portion 315 calculates and outputs the grayscale level cb similarly to the applied modified example (1) of the first embodiment.

In addition, the description of the grayscale levels ca and cb are the same as that of the adapted modified example of the first embodiment. In addition, the determination portion 310 of FIG. 17 determines only whether or not the pixel represented by the delayed video signal Vid-d is adjacent to the applied boundary, that is, the boundary changed from one frame among the boundaries detected in the current frame.

In the configuration, if the flag Q output from the determination portion 310 is "1", it denotes that the pixel corresponding to the video signal Vid-d is adjacent to the applied boundary. Therefore, if the flag Q is "1", the video signal Vid-d is replaced by a grayscale level output from the calculation portion 315, so that it is output as a video signal Vid-out. In the determined applied boundary, although a dark pixel is adjacent to a bright pixel, the calculation portion 315 outputs a grayscale level ca of the dark pixel and calculates and outputs a grayscale level cb of the bright pixel.

A detailed example of the correction process of the video processing circuit 30 illustrated in FIG. 17 is described.

In the case where the image represented by the video signal of the one frame preceding the current frame is that illustrated in, for example, (1) of FIG. 15 and the image represented by the video signal Vid-in of the current frame is that illustrated in, for example, (2) of FIG. 15, the boundary of the image of the preceding frame and the boundary of the image of the current frame are those illustrated in (3) of FIG. 15, and the applied boundary determined by the applied-boundary determination portion 304 is that illustrated in (4) of FIG. 16.

In the video processing circuit 30 according to the applied modified example of the second embodiment, the dark pixel adjacent to the portion changed from the boundary of the preceding frame among the boundaries between the dark pixel and the bright pixel in the current frame is replaced with the grayscale level ca, and the bright pixel is replaced with the grayscale level cb, which is output as a video signal Vid-out. Therefore, the image illustrated in (2) of FIG. 15 is corrected with such a grayscale level as illustrated in (5*b*) of FIG. 16 by the video processing circuit 30 according to the applied modified example of the second embodiment.

Therefore, in the video processing circuit according to the applied modified example of the second embodiment, it is possible to prevent the occurrence of the defects in the display caused by the reverse tilt domain in advance and to suppress the shifting of the outline portion viewed by the user from the image represented by the video signal Vid-in.

In addition, similarly to (5*a*) of FIG. 16, in (5*b*) of FIG. 16, with respect to the pixel indicated by #2, there may be provided a configuration of no replacement with the grayscale level c1. In addition, in (5*b*) of FIG. 16, although the pixel indicated by #3 is replaced with the grayscale level c1 by taking into consideration that the pixel is adjacent to the applied boundary, in this example, since the pattern of the dark pixels is moved in the horizontal direction, the influence of the transverse electric field is considered to be small, and the influence to the outline is also considered to be small. Therefore, with respect to the pixel indicated by #3, there may be provided a configuration of no replacement with the grayscale level cb but outputting with the grayscale level represented by the video signal Vid-d.

In the second embodiment, the grayscale level of the pixel having the lower applied voltage among the pixels interposing the boundary with being adjacent thereto is configured to be corrected. In the applied modified example of the second embodiment, the grayscale levels of the two pixels interposing the boundary with being adjacent thereto is configured to be corrected. However, the grayscale levels of three or more pixels may be configured to be corrected. Particularly, once the reverse tilt domain occurs, there is a tendency in that spreading occurs over the portion having a weak longitudinal electric field. In addition, in the case where the area which is to be the dark pixels is slowing moved, if the grayscale levels of the three or more pixels are corrected, the time of correction is increased, so that there is an effect of suppressing the reverse tilt domain. Therefore, with respect to the pixels near the boundary having a strong transverse electric field, it is preferable that the correction is performed over as many pixels as possible such that two pixels are better than one pixel, and three or more pixels are better than two pixels.

In the aforementioned embodiments, although the grayscale of the pixel is designated by the video signal Vid-in, the applied voltage of the liquid crystal element may be directly designated. In the case where the video signal Vid-in designates the applied voltage of the liquid crystal element, a configuration of determining the boundary by the designated applied voltage and correcting the voltage may be employed.

In addition, in the aforementioned embodiments, the liquid crystal element 120 is not limited to a transmission type, but it may be a reflective type. In addition, the liquid crystal element 120 is not limited to a normally black mode, but it may be a normally white mode.

Electronic Apparatus

Figure 18:
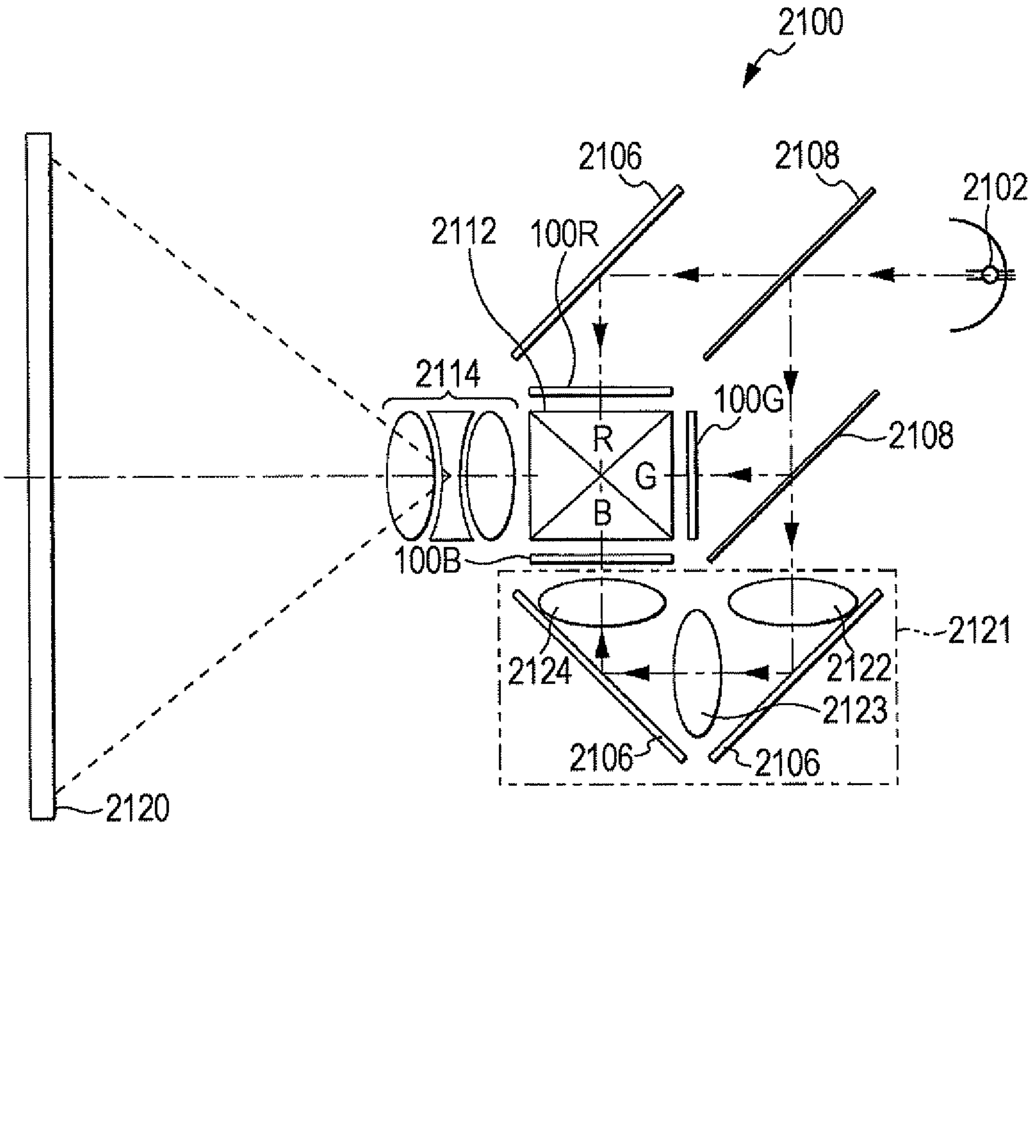
FIG. 18 is a diagram illustrating a projector employing a liquid crystal display apparatus according to an embodiment of the invention.

Next, as an example of an electronic apparatus using a liquid crystal display apparatus according to the aforementioned embodiments, a projection type display apparatus (projector) using the liquid crystal panel 100 as a light valve is described. FIG. 18 is a plan view illustrating a configuration of the projector.

As illustrated in this figure, a lamp unit 2102, which is constructed with a white color light source such as a halogen lamp, is disposed in an inner portion of the projector 2100. The projection light emitted from the lamp unit 2102 is split into three primary colors of R (red), G (green), and B (blue) colors by three mirrors 2106 and two dichroic mirrors 2108, which are internally disposed, and are guided to the light valves 100R, 100G, and 100B corresponding to the primary colors. In addition, since the light path of the light of the B color is longer than the light of the R and G colors, the light of the B color is guided by a relay lens system 2121 including an incidence lens 2122, a relay lens 2123, and an emission lens 2124 in order to preventing loss thereof.

The projector 2100 is provided with three sets of liquid crystal display apparatus including the liquid crystal panels 100 in correspondence with the R, G, and B colors. The configuration of the light valves 100R, 100G, and 100B is the same as that of the aforementioned liquid crystal panel 100. The video signals of designating grayscale levels of the primary color components of the R, G, and B colors are configured to be supplied from external upper-level circuits so as to drive the light valves 100R, 100G, and 100B.

The light modulated by the light valves 100R, 100G, and 100B are incident to the dichroic prism 2112 in the three directions. In addition, the light of the R and B colors is refracted by 90 degrees in the dichroic prism 2112, and the light of the G color goes straight.

Therefore, after the images corresponding to the primary colors are combined, the color image is projected on the screen 2120 by the projection lens 2114.

In addition, since light corresponding to R, G, and B colors is incident to the light valves 100R, 100G, and 100B by the dichroic mirror 2108, any color filters may not have to be provided. In addition, the image passing through the light valves 100R and 100B is projected after the image is reflected by the dichroic prism 2112, and on the contrary, the image passing through the light valve 100G is projected without reflection. Therefore, the direction of the horizontal scanning associated with the light valves 100R and 100B is opposite to the direction of the horizontal scanning associated with the light valve 100G, so that a configuration of displaying the image, of which the left and right portions are inverted, is implemented, In addition to the projector described with reference to FIG. 18, the electronic apparatus may include television sets, viewfinder type direct-view monitor video tape recorder, car navigation apparatuses, pagers, electronic diaries, electronic calculators, wordprocessors, workstations, video phones, POS terminals, digital still cameras, mobile phones, apparatuses having a touch panel, and the like. In addition, the aforementioned liquid crystal displays may be adapted to the various electronic apparatuses.

What is claimed is:

1. A video processing circuit for use with a liquid crystal display that includes pixels, the video processing circuit designating an applied voltage to be applied to at least one of the pixels based on a video signal, the video processing circuit comprising:

a first boundary detection portion that analyzes a video signal of a first frame and detects a first boundary between a first pixel having a first applied voltage and a second pixel having a second applied voltage, the first pixel being disposed adjacent to the second pixel, the first applied voltage being lower than the second applied voltage;

a second boundary detection portion that analyzes a video signal of a second frame preceding the first frame and detects a second boundary between a third pixel having a third applied voltage and a fourth pixel having a fourth applied voltage, the third pixel being disposed adjacent to the fourth pixel, the third applied voltage being lower than the fourth applied voltage;

and a correction portion that corrects the first applied voltage to a fifth applied voltage if the first boundary is an applied boundary and the applied boundary does not exist at a position corresponding to a position of the second boundary, the fifth applied voltage being higher than the first applied voltage and the fifth applied voltage being lower than the second applied voltage.

2. A video processing circuit for use with a liquid crystal display that includes pixels, the video processing circuit designating an applied voltage to be applied to at least one of the pixels based on a video signal, the video processing circuit comprising:

a first boundary detection portion that analyzes a video signal of a first frame and detects a first boundary between a first pixel having an applied voltage that is lower than a first voltage and a second pixel having an applied voltage that is higher than a second voltage that is higher than the first voltage;

a second boundary detection portion that analyzes a video signal of a second frame preceding the first frame and detects a second boundary between a third pixel having an applied voltage that is lower than the first voltage and a fourth pixel having an applied voltage that is higher than the second voltage; and a correction portion that corrects the applied voltage of the first pixel to a third voltage if the first boundary is an applied boundary and the applied boundary does not exist at a position corresponding to a position of the second boundary, the third voltage being higher than the first voltage and being lower than the second voltage.

3. A video processing method of designating an applied voltage to be applied to at least one pixel of a liquid crystal display, based on a video signal, comprising:

analyzing a video signal of a first frame and detecting a first boundary between a first pixel having a first applied voltage and a second pixel having a second applied voltage, the first pixel being disposed adjacent to the second pixel, the first applied voltage being lower than the second applied voltage;

analyzing a video signal of a second frame preceding the first frame and detecting a second boundary between a third pixel having a third applied voltage and a fourth pixel having a fourth applied voltage, the third pixel being disposed adjacent to the fourth pixel, the third applied voltage being lower than the fourth applied voltage; and correcting the first applied voltage to a fifth applied voltage if the first boundary is an applied boundary and the applied boundary does not exist at a position corresponding to a position of the second boundary, the fifth applied voltage being; higher than the first applied voltage and the fifth applied voltage being lower than the second applied voltage.

4. The video processing circuit according to claim 2, wherein the first voltage may be an optical threshold voltage that sets a relative transmittance of a liquid crystal element to 10%.

5. The video processing circuit according to claim 2, wherein the second voltage may be an optical threshold voltage that sets a relative transmittance of a liquid crystal element to 90%.

6. A video processing circuit for use with a liquid crystal display that includes pixels, the video processing circuit designating an applied voltage to be applied to at least one of the pixels based on a video signal, the video processing circuit comprising:

a first boundary detection portion that analyzes a video signal of a first frame and detects a first boundary between a first pixel displaying a first grayscale and a second pixel displaying a second grayscale, the first pixel being disposed adjacent to the second pixel, the first grayscale including a first grayscale range that includes a minimum grayscale value, the second grayscale including a second grayscale range that includes a maximum grayscale value;

a second boundary detection portion that analyzes a video signal of a second frame preceding the first frame and detects a second boundary between a third pixel displaying a third grayscale and a fourth pixel displaying a fourth grayscale, the third pixel being disposed adjacent to the fourth pixel, the third grayscale including the first grayscale range, the fourth grayscale including the second grayscale range; and a correction portion that corrects a displaying grayscale of the first pixel to a fifth grayscale if the first boundary is an applied boundary and the applied boundary does not exist at a position corresponding to a position of the second boundary, the fifth grayscale being higher than the first grayscale and being lower than the second grayscale.

7. The video processing circuit according to claim 1, wherein the correction portion further corrects the second applied voltage to a sixth applied voltage if the first boundary is the applied boundary, the sixth applied voltage being lower than the second applied voltage and higher than the fifth applied voltage.

8. The video processing circuit according to claim 1, the correction portion further comprising:

an applied boundary determination portion determining the first boundary as the applied boundary except when the first boundary exists at the position corresponding to the second boundary.

9. The video processing circuit according to claim 1, wherein the first applied voltage is lower than a voltage that provides an initial tilt angle to a liquid crystal molecule, and the fifth applied voltage is a voltage that provides an initial tilt angle to the liquid crystal molecule.

10. The video processing circuit according to claim 1, wherein the correction portion further corrects the fifth pixel in a same way as the first pixel, and the first pixel is disposed between the fifth pixel and the second pixel.

11. The video processing circuit according to claim 7, wherein the correction portion further corrects the sixth pixel in a same way as the second pixel, and the second pixel is disposed between the first pixel and the sixth pixel.

12. The video processing circuit according to claim 1, wherein the first applied voltage is a voltage that displays a first grayscale near a minimum grayscale value to the first pixel, and the second applied voltage is a voltage that displays a second grayscale near a maximum grayscale value to the second pixel.

13. The liquid crystal display having the video processing circuit according to claim 1, the liquid crystal display comprising:

a liquid crystal panel comprising a plurality of pixels and comprising a pixel electrode disposed on a first substrate, a common electrode disposed on a second substrate, and a liquid crystal element formed by interposing liquid crystal between the pixel electrode and the common electrode.

14. An electronic apparatus having the liquid crystal display according to claim 13.

* * * * *